United States Patent
Chen et al.

(10) Patent No.: US 10,135,947 B1
(45) Date of Patent: Nov. 20, 2018

(54) WIRELESS MULTICAST TRANSMISSION AND RECOVERY

(71) Applicant: Amazon Technologies, Inc., Seattle, WA (US)

(72) Inventors: Yajun Chen, Santa Clara, CA (US); Peng Zhan, San Jose, CA (US); Qingyuan Ma, Saratoga, CA (US); Zhen Zhou, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 172 days.

(21) Appl. No.: 15/212,941

(22) Filed: Jul. 18, 2016

(51) Int. Cl.
*H04L 29/08* (2006.01)
*H04W 4/06* (2009.01)
*G06F 8/61* (2018.01)
*H04W 76/10* (2018.01)

(52) U.S. Cl.
CPC ............... *H04L 67/34* (2013.01); *G06F 8/61* (2013.01); *H04W 4/06* (2013.01); *H04W 76/10* (2018.02)

(58) Field of Classification Search
CPC ........ H04L 67/108; H04W 76/10; H04W 4/06
See application file for complete search history.

(56) References Cited

U.S. PATENT DOCUMENTS

2012/0259994 A1* 10/2012 Gillies ............... H04L 12/1881 709/231
2017/0351581 A1* 12/2017 Bakshan ............. G06F 11/1464

* cited by examiner

*Primary Examiner* — Brandon M Renner
*Assistant Examiner* — The Hy Nguyen
(74) *Attorney, Agent, or Firm* — Pierce Atwood LLP

(57) ABSTRACT

A transmission system that sends data to multiple devices simultaneously using multiple access points (APs). The system may send multicast data (e.g., original transmission of multicast data) to the multiple devices using a first AP and may send recovery data (e.g., retransmission of portions of the multicast data) to individual devices using a second AP. As the second AP handles requests for the recovery data and sends the recovery data, the first AP may send the multicast data using all available bandwidth and an efficiency of transmission does not depend on the number of devices connected to the first AP. The recovery data may be determined based on an original manifest of the multicast data, such as a bitmap or other representation, and the device may generate a recovery manifest indicating the recovery data and send the recovery manifest to the second AP.

16 Claims, 14 Drawing Sheets

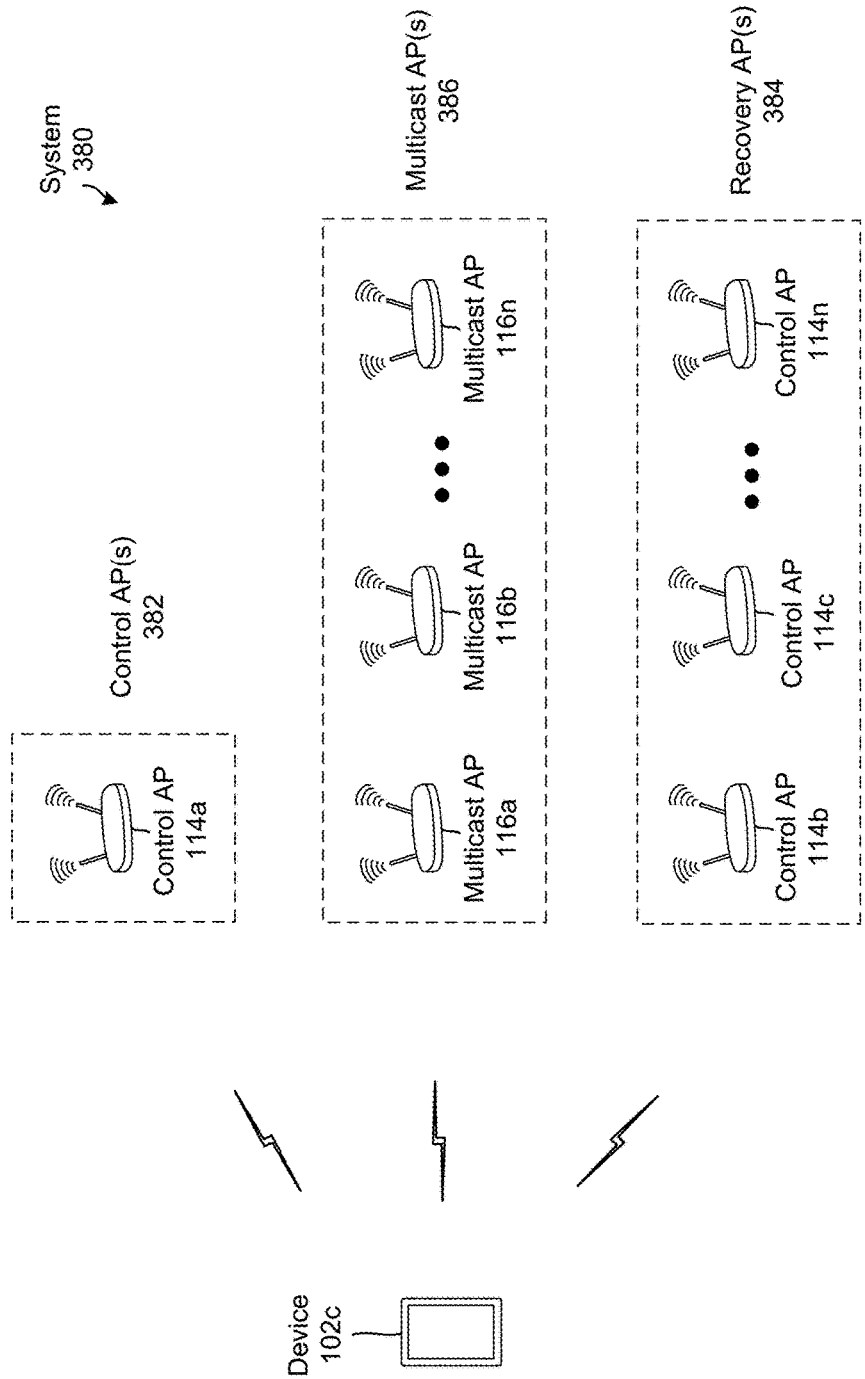

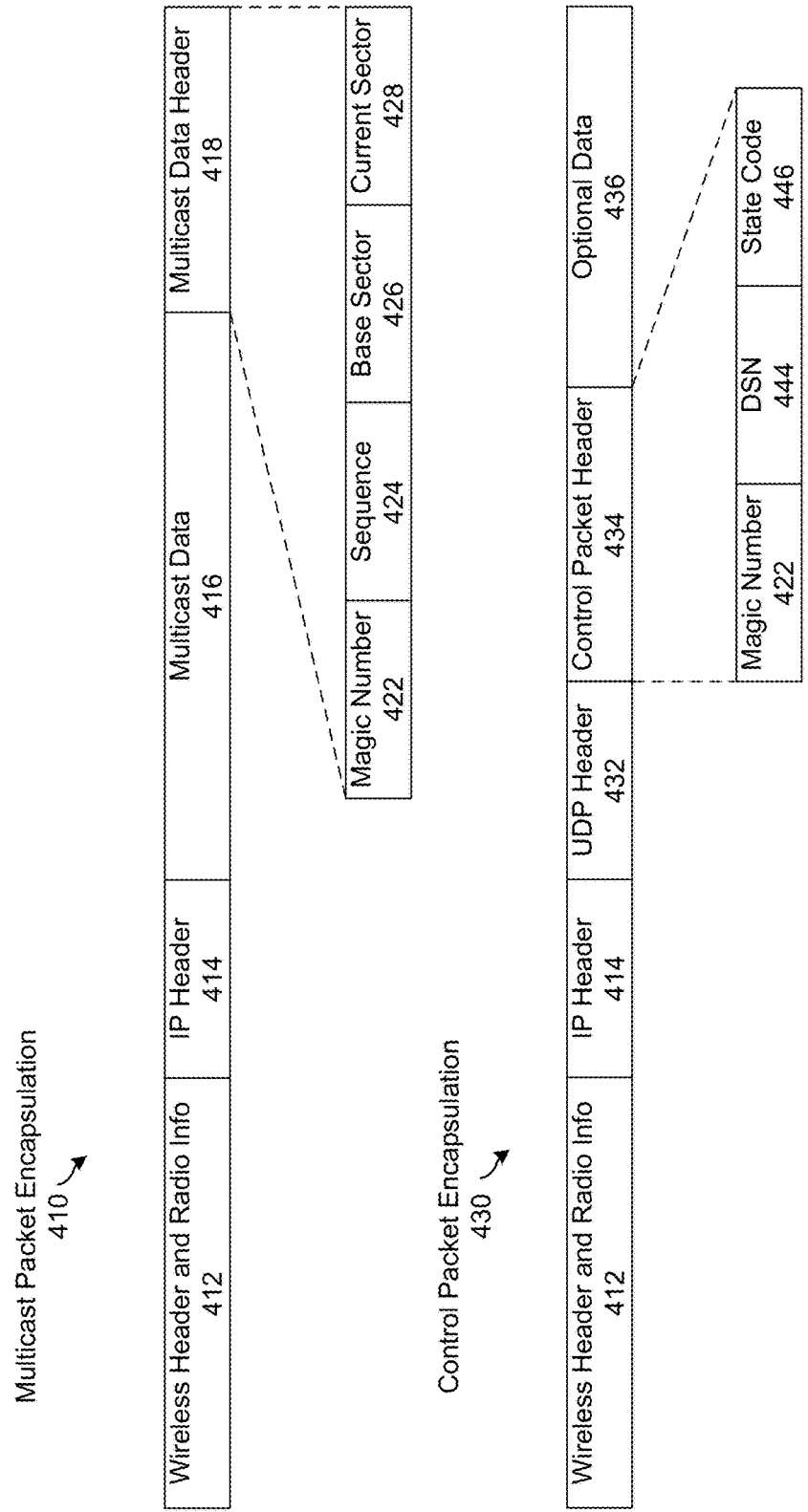

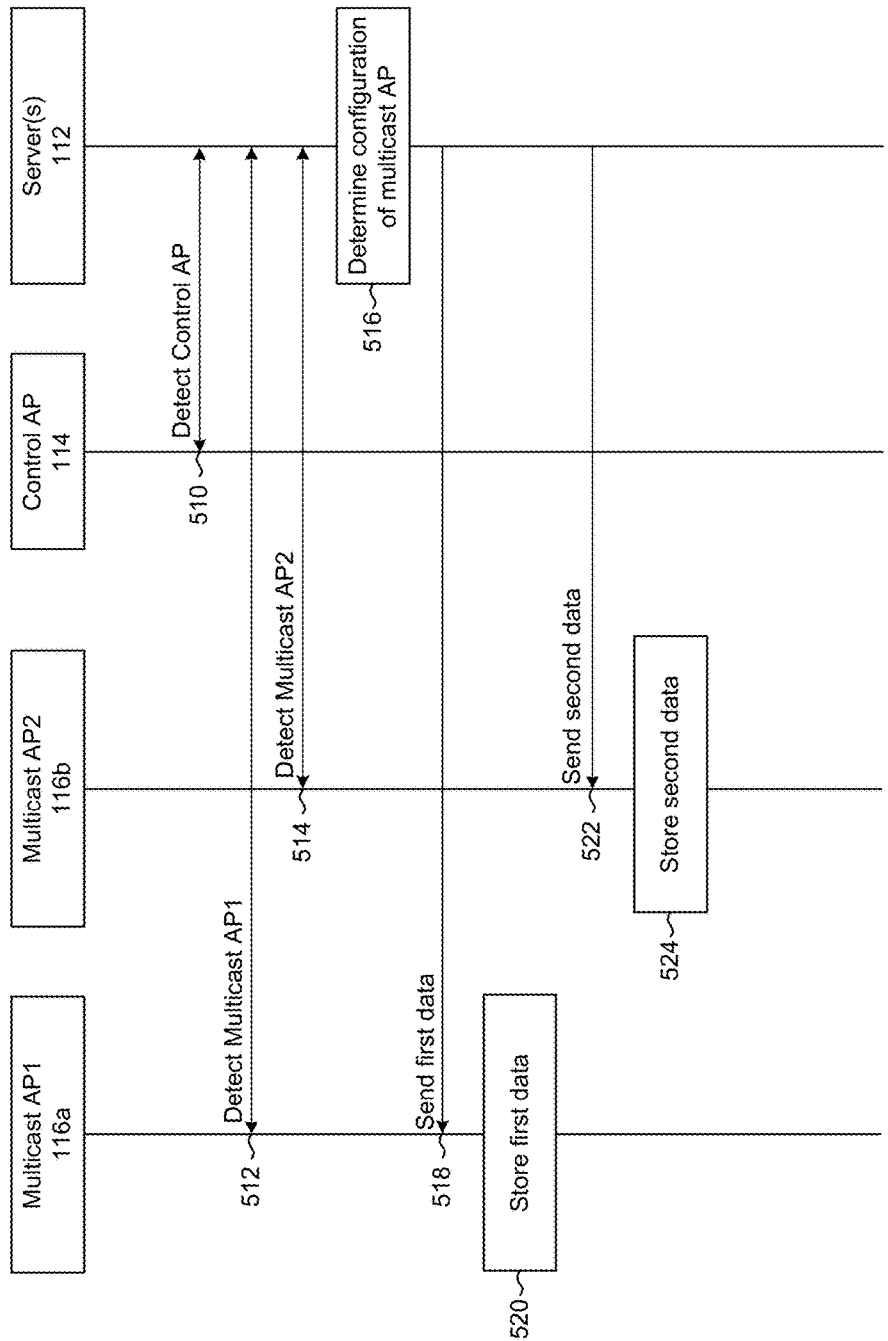

Recovery Manifest 700

Missing Data 710

Recovery Data 720

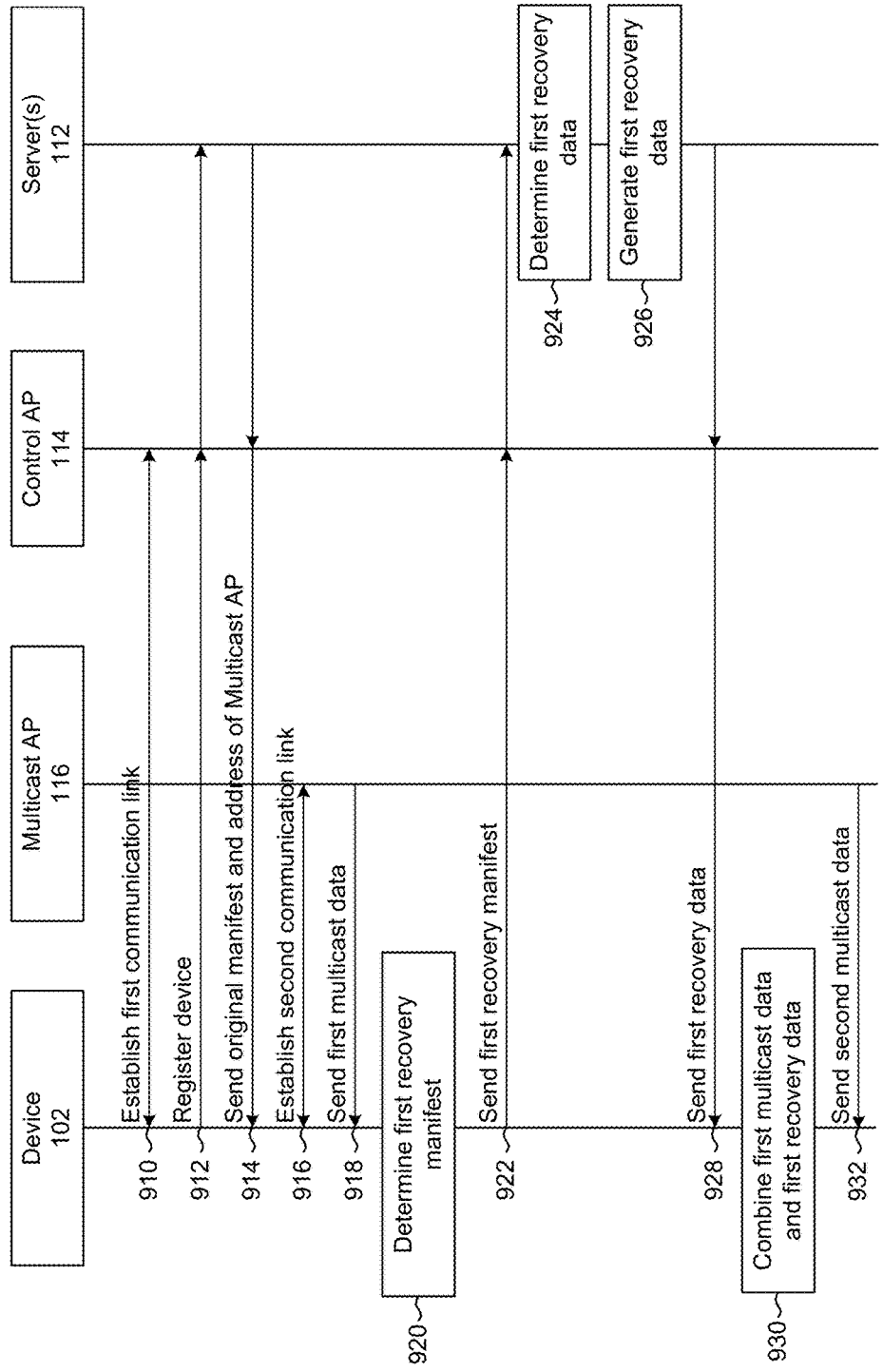

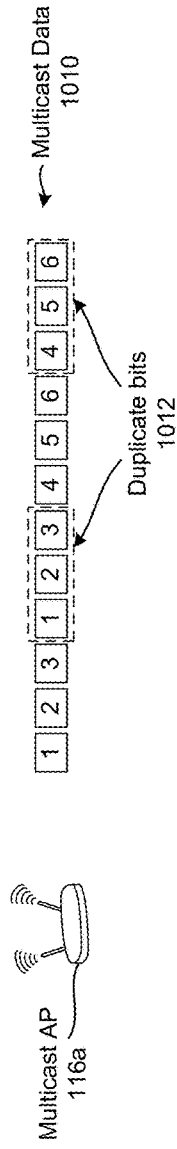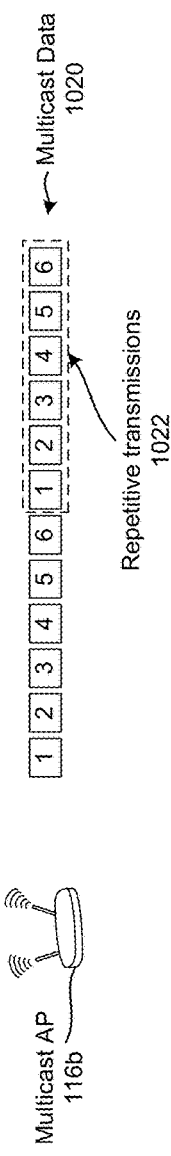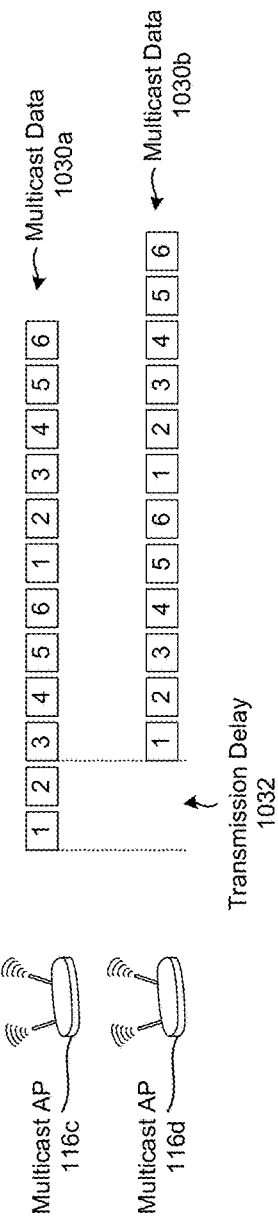

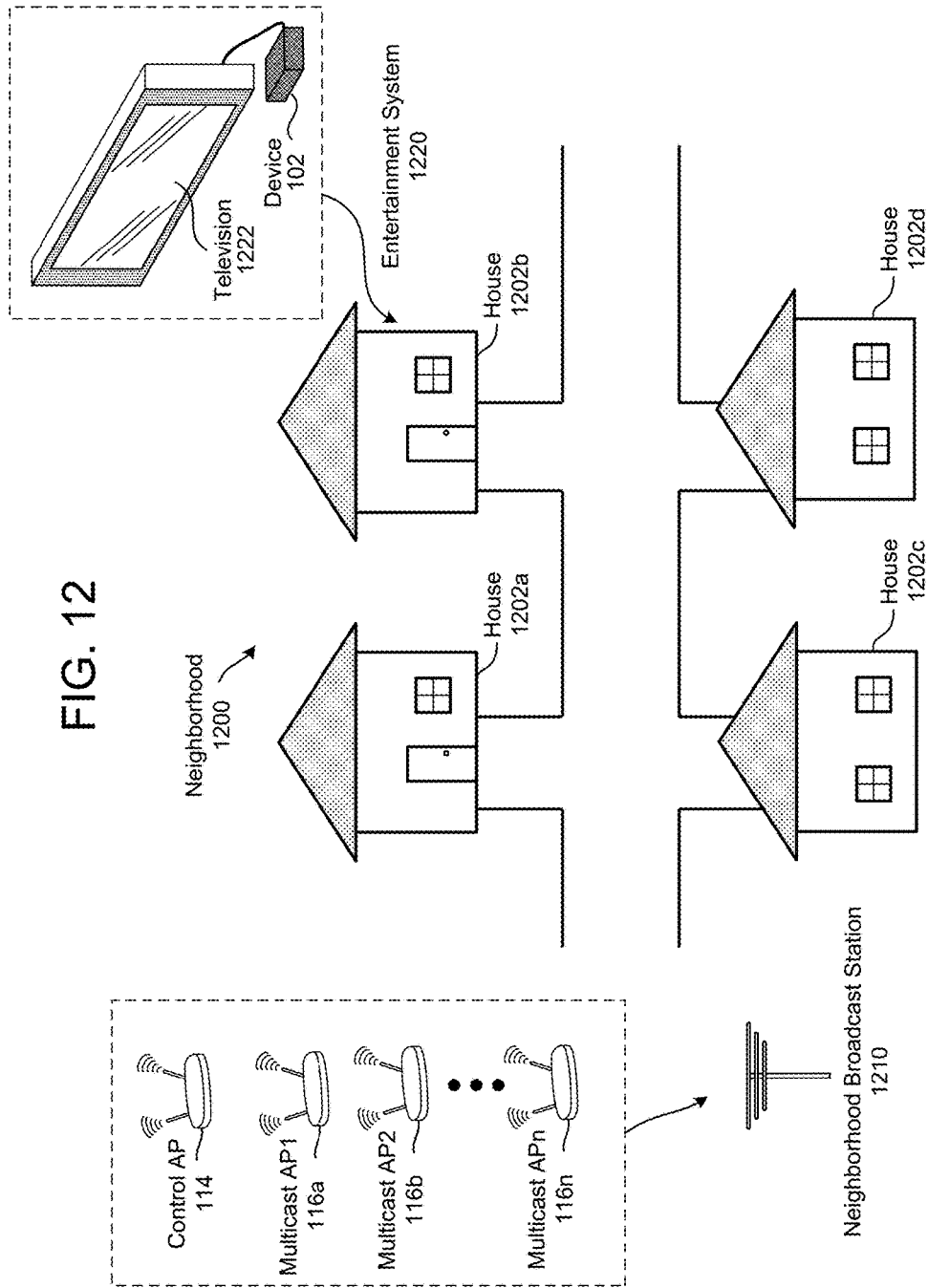

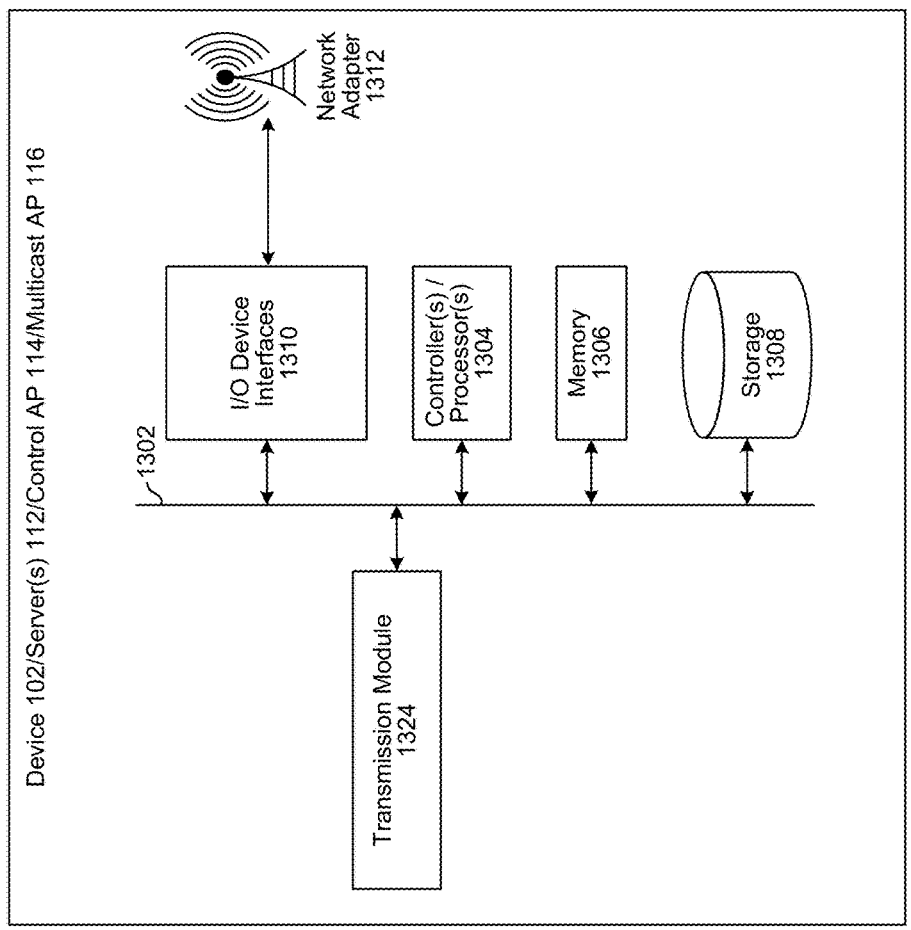

WIRELESS MULTICAST TRANSMISSION AND RECOVERY

BACKGROUND

Electronic devices may receive data from a network via an access point. The access point may transmit the data individually to the device (e.g., unicast transmission) or to multiple devices simultaneously (e.g., multicast transmission). If the access point sends data to multiple devices using unicast transmission, the bandwidth is split between the multiple devices and each device receives the data using a portion of the total bandwidth. If the access point sends the data to multiple devices using a multicast transmission, each device receives the data using all of the total bandwidth.

BRIEF DESCRIPTION OF DRAWINGS

For a more complete understanding of the present disclosure, reference is now made to the following description taken in conjunction with the accompanying drawings.

FIGS. 3A-3C illustrate examples of sequential transmissions and concurrent transmissions according to embodiments of the present disclosure.

FIG. 4 illustrates examples of packet encapsulation for multicast transmission and unicast transmission according to embodiments of the present disclosure.

FIG. 5 is a communication diagram conceptually illustrating an example method for initializing multicast access points according to embodiments of the present disclosure.

FIG. 9 is a communication diagram conceptually illustrating an example method for sending multicast data and recovery data simultaneously according to embodiments of the present disclosure.

FIGS. 10A-10C illustrate examples of transmitting duplicate multicast data to recover lost data according to embodiments of the present disclosure.

FIG. 12 illustrates an example of a neighborhood broadcast implementation according to embodiments of the present disclosure.

FIG. 13 is a block diagram conceptually illustrating example components of a system for echo cancellation according to embodiments of the present disclosure.

DETAILED DESCRIPTION

Figure 1:
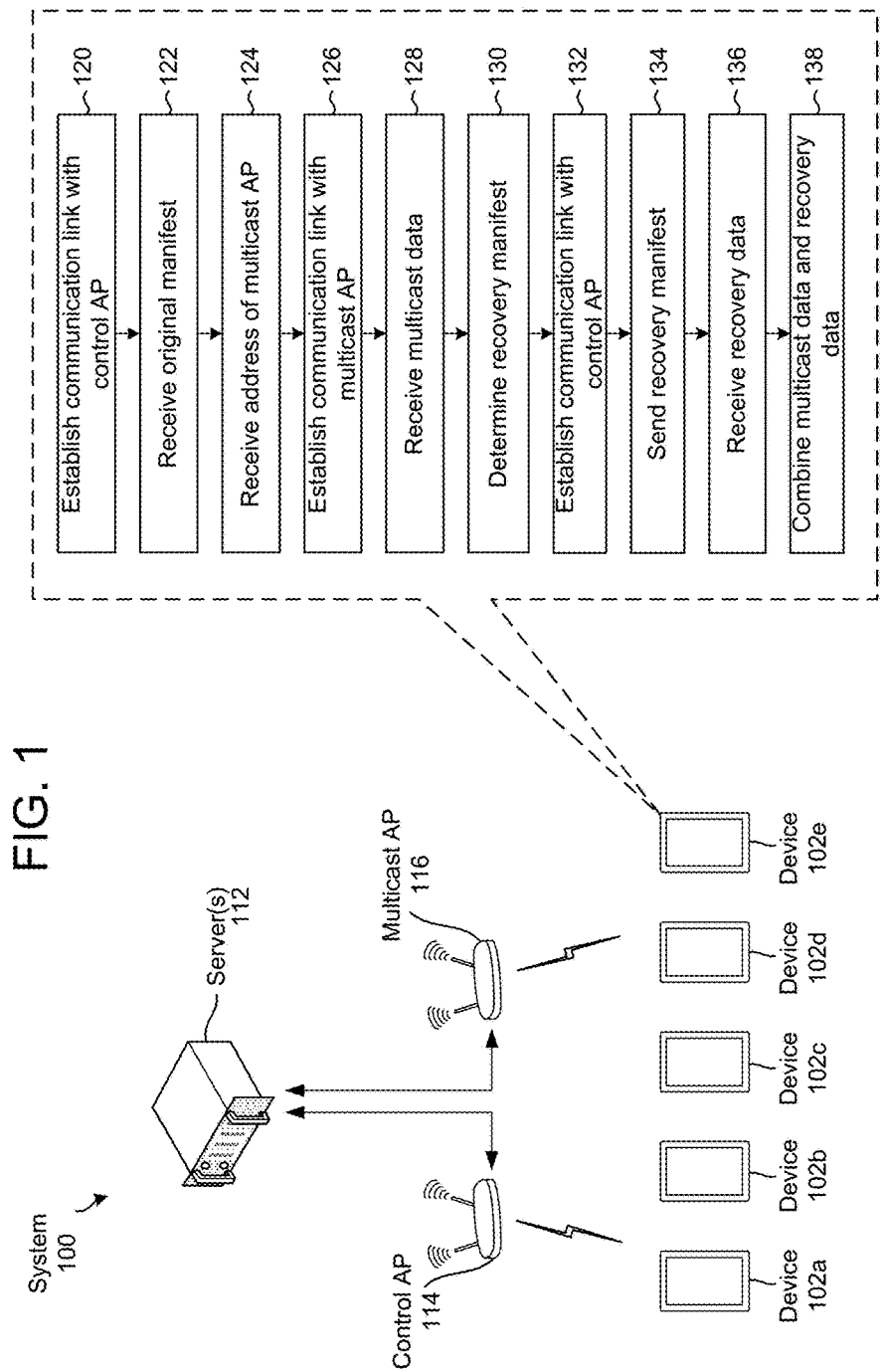
FIG. 1 illustrates a multicast and recovery system according to embodiments of the present disclosure.

Electronic devices include firmware, which is permanent software embedded in read-only memory on the electronic device. Typically, firmware is updated using a wired connection, such as a Universal Serial Bus (USB) connection. For example, to update firmware in a plurality of devices, a computer may connect to and send the firmware data to each of the devices individually using the USB connection. The number of simultaneous connections may be limited and the devices must be in proximity to the computer to update the firmware.

Instead of connecting to each of the devices using a wired connection, the computer may connect to each of the devices using an access point. While the devices may receive the firmware data from the access point at a greater distance than the wired connection, the number of simultaneous connections is still limited by an available bandwidth of the access point. For example, when the access point sends the firmware data individually to the device (e.g., unicast transmission), the available bandwidth is split between the multiple devices and each device receives the firmware data using only a portion of the total bandwidth, reducing transfer rates. Alternatively, the access point may send the firmware data to multiple devices simultaneously (e.g., multicast transmission), allowing each of the devices to receive the firmware data using all of the available bandwidth. However, the multicast transmission is not as reliable as the unicast transmission and therefore each of the individual devices may not receive a portion of the firmware data (e.g., lost data). In order to recover the lost data, the individual devices may request the lost data from the access point. As the access point receives requests from the individual devices and sends recovery data to the individual devices, an efficiency of the multicast transmission is reduced because a bandwidth associated with the multicast transmission is reduced. Therefore, even using multicast transmission, the number of simultaneous connections is still limited by an available bandwidth of the access point.

To improve a multicast transmission and/or increase a number of simultaneous connections to the access point, devices, systems and methods are disclosed for sending multicast data using a multicast transmission via a first access point and sending recovery data via a second access point. For example, the first access point may send the multicast data to all of the devices connected to the first access point using a multicast transmission, making use of the total bandwidth available to the first access point to improve transfer rates. After receiving the multicast data from the first access point, individual devices may connect to the second access point, send requests for lost data to the second access point and receive recovery data corresponding to the lost data from the second access point. Therefore, the requests for lost data do not affect the first access point and the first access point may send the multicast data without reducing a bandwidth and/or transfer rate of the multicast transmission. The multicast data may correspond to the firmware data discussed above, but the disclosure is not limited thereto and the multicast data may correspond to any audio visual data such as digital content (e.g., audio, images, video, etc.). Thus, the system may send a plurality of multicast data using a plurality of access points and a device may receive varying different digital content depending on which access point the device is connected.

FIG. 1 illustrates a high-level conceptual block diagram of a system 100 for sending multicast data to multiple devices 102. As illustrated in FIG. 1, the system 100 may include server(s) 112 communicatively coupled to a control AP 114 and a multicast AP 116, along with devices 102 (e.g., 102a-102e). The devices 102 may connect to the control AP 114 and/or the multicast AP 116 to receive data. The data may include digital content (e.g., audio, images, video or the like), digital files (e.g., firmware data, multimedia documents, such as text files or the like, etc.) or other data, and may be streamed to the devices 102 (e.g., portions of the data received and displayed over time) and/or downloaded to the devices 102 (e.g., entirety of the data received and stored on the device 102 prior to displaying the data).

The system 100 may send the data to the devices 102 using the control AP 114 and/or the multicast AP 116. To improve an efficiency of sending the data, the multicast AP 116 may send the data to the devices 102 using a multicast transmission, which enables each of the devices 102 to receive the data using all of the available bandwidth. However, the multicast transmission may result in lost data that is not received by an individual device 102 (e.g., first lost data for first device 102a, second lost data for second device 102b, etc.), and the devices 102 typically request the lost data from the multicast AP 116. While the multicast AP 116 may send the data with a low data loss rate (e.g., 1%), an efficiency of the multicast transmission is reduced as the number of devices 102 receiving the data from the multicast AP 116 increases as the multicast AP 116 has to handle additional re-transmission requests from any of the devices 102 that experienced errors receiving the first transmission (e.g., send first recovery data corresponding to the first lost data to the first device 102a, send second recovery data corresponding to the second lost data to the second device 102b, etc.). For example, if the multicast AP 116 sends 2 GB of data to the devices 102, each of the devices 102 may experience 20 MB of lost data that the multicast AP 116 has to retransmit.

Figure 2:
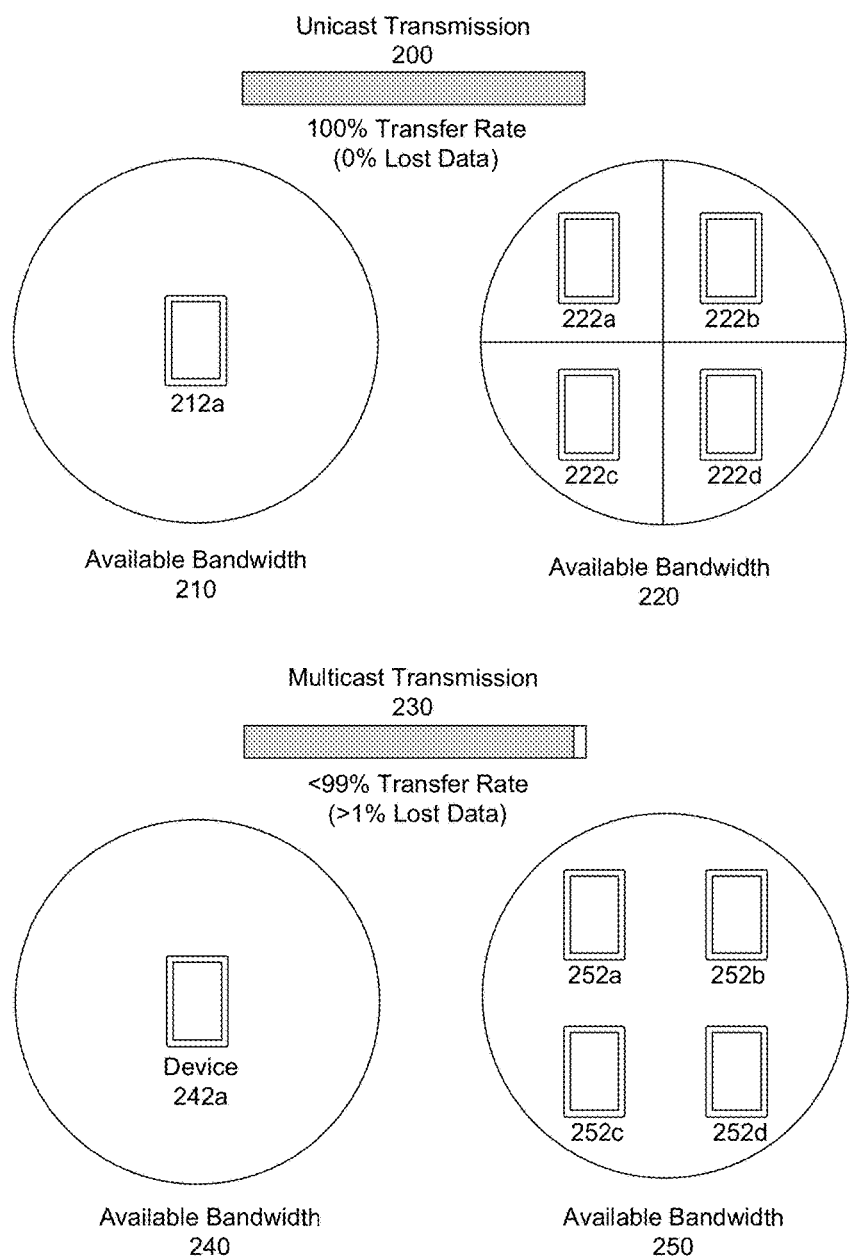
FIG. 2 illustrates differences between unicast transmissions and multicast transmissions.

FIG. 2 illustrates differences between unicast transmissions and multicast transmissions. As illustrated in FIG. 2, a unicast transmission 200 has a 100% transfer rate (0% lost data), meaning that all data sent from an access point to a device is eventually received by the device. For example, the unicast transmission 200 may use transmission control protocol (TCP) or the like that allows for handshaking, error correction and/or other features that determine that the device did not receive a data packet (e.g., lost data) and retransmit the data packet. While some data packets require retransmission, the device receives all of the data sent from the access point.

However, the reliability of the unicast transmission 200 consumes available bandwidth as the access point has to send data to each device individually. Thus, as the access point sends data to additional devices, the amount of bandwidth available for each device is reduced, resulting in slower transfer speeds or the like. As illustrated in FIG. 2, when a single device 212a is connected to the access point, the device 212a may receive data using all of available bandwidth 210. For example, the device 212a may receive data at a maximum transfer rate associated with the available bandwidth 210. However, when multiple devices 222a/222b/222c/222d are connected to the access point, each of the devices 222 may receive data using only a portion (e.g., 25%) of available bandwidth 220. For example, the device 222a may receive data at a quarter of the maximum transfer rate as the device 222a is competing for the available bandwidth 220 with the other devices 222.

While FIG. 2 illustrates the available bandwidth 220 being split equally between the devices 222, this is intended for illustrative purposes only and the disclosure is not limited thereto. Instead, the amount of bandwidth available to each of the devices 222 may vary over time and/or individual devices 222 may consume more of the available bandwidth without departing from the disclosure.

While the unicast transmission 200 sends data to each device individually, the multicast transmission 230 sends data to multiple devices simultaneously. Therefore, the access point may send data to additional devices without affecting the amount of bandwidth available for each device, reducing the transfer speeds or the like. As illustrated in FIG. 2, when a single device 242a is connected to the access point, the device 242a may receive data using all of available bandwidth 240. For example, the device 242a may receive data at a maximum transfer rate associated with the available bandwidth 240. However, when multiple devices 252a/252b/252c/252d are connected to the access point, each of the devices 252 receive data using all of available bandwidth 250. For example, the device 252a may receive data at the maximum transfer rate as the device 252a is sharing the available bandwidth 250 with the other devices 222.

In order to share the available bandwidth 250 between the devices 250 and maintain the maximum transfer rate, however, the access point sends data packets without regard to whether they are correctly received by the devices 252. Thus, the multicast transmission 230 does not retransmit lost data packets that are received with errors and/or not received by individual devices 252, resulting in a transfer rate below 99% (e.g., at least 1% lost data). For example, the multicast transmission 230 may use user datagram protocol (UDP) or the like that does not allow for handshaking, error correction and/or other features to determine that the devices 252 did not correctly receive a data packet and retransmit the data packet.

In some applications, losing the lost data packets is not fatal and the device 252 may continue without the access point retransmitting the lost data packets. For example, streaming content (e.g., audio and/or video), real-time multiplayer videogames, voice over internet protocol (VoW) or the like may prioritize latency over reliability and may generate content with errors and/or missing data. If the data is sent using UDP, for example, the device 252 may continue to generate the content despite errors and/or missing data, whereas if the data is sent using TCP the device 252 would not be able to continue generating the content as TCP does not provide subsequent data packets while requesting retransmission of the lost data packets, resulting in latency and/or distortion.

However, some applications require the lost data packets to function properly. For example, while lost data packets are not fatal for streaming content (e.g., lost data packets result in temporary interruptions, such as distortion, blank frames or a delay, before the streaming content continues), the lost data packets may be fatal for stored content (e.g., the content becomes corrupted without the lost data packets). Examples of stored content include digital content (e.g., audio, image, video, or the like) stored on the device 252, digital files (e.g., multimedia documents, such as text files or the like, firmware data, or the like) or other data that is stored on the device 252. In order for the stored content to be complete and function properly, the device 252 must request retransmission of the lost data packets and the access point must retransmit the lost data packets to the device 252.

While the access point is capable of sending the multicast transmission 230 to a large number of devices 252 without reducing transfer rates, the access point would need to retransmit the lost data packets to each of the devices 252 individually using the unicast transmission 200. The more the access point retransmits the lost data packets, the more bandwidth is consumed in the unicast transmission 200 and the less bandwidth is available for the multicast transmission 230. Thus, transfer rates of the multicast transmission 230 would be reduced as the access point is connected to additional devices 252.

In order improve an efficiency of the multicast transmission 230, the system 100 illustrated in FIG. 1 may send data to the devices 102 via the multicast AP 116 using the multicast transmission 230 and send recovery data corresponding to the lost data to the devices 102 via the control AP 114 using the unicast transmission 200. For example, the multicast AP 116 may send data to the devices 102 using a total bandwidth of the multicast AP 116 and the control AP 114 may send first recovery data to the first device 102a using first bandwidth, second recovery data to the second device 102b using second bandwidth, etc. Thus, the control AP 114 may send individual recovery data to each of the devices 102 using the unicast transmission 200 without affecting the multicast transmission 230.

As illustrated in FIG. 1, the device 102 may establish (120) a first communication link with the control AP 114, receive (122) an original manifest corresponding to data to be sent to the device 102 from the control AP 114 and receive (124) an address of the multicast AP 116 to which to connect. For example, the control AP 114 may identify an individual multicast AP 116 from a plurality of multicast APs 116 and may send the device 102 the address for the individual multicast AP 116.

The original manifest may be a bitmap corresponding to the data to be sent to the device 102. Thus, bits in the bitmap may correspond to portions of the data, such as a memory address or sequence number or the like. To illustrate an example, the data to be sent to the device 102 may be firmware data to update a firmware of the device 102. The firmware of the device 102 may be stored in solid-state storage (e.g., embedded multimedia card (eMMC)), so each bit in the original manifest may correspond to a physical memory address of the firmware in the solid-state storage (e.g., a first memory address corresponds to a first 1 KB of firmware memory, a second memory address corresponds to a second 1 KB of firmware memory, etc.). In some examples, not all of the firmware data needs to be updated and the original manifest may indicate the bits (e.g., memory addresses) to be sent to the device 102. For example, the original manifest sent by the control AP 114 to the device 102 may store values of "1" to indicate specific bits that are to be sent to the device 102 and may store values of "0" to indicate specific bits that are not to be sent to the device 102. Thus, the original manifest may include bits having a value of "0" for the bits left unchanged and bits having a value of "1" for the bits corresponding to firmware data to be sent to the device 102. However, the disclosure is not limited thereto and the original manifest may correspond to new data to be sent to the device 102. For example, all of the bits in the original manifest may have a value of "1," indicating that the data to be sent to the device 102 includes all of the bits.

The device 102 may establish (126) a second communication link with the multicast AP 116, receive (128) multicast data from the multicast AP 116 and determine (130) a recovery manifest from the received multicast data and the original manifest. Thus, the device 102 may receive multicast data and modify the original manifest to indicate that the data was received. For example, the device 102 may receive a portion of the multicast data, identify a corresponding bit in the original manifest and modify a value of the bit from a value of "1" (e.g., indicating data to be sent to the device 102) to a value of "0" (indicating that the data was received by the device 102) in the recovery manifest. Thus, the recovery manifest is a modified version of the original manifest and indicates data that was intended to be sent to the device 102 (e.g., bits having a value of "1" in the original manifest) that was not received by the device 102.

The device 102 may establish (132) a third communication link with the control AP 114 and may send (134) the recovery manifest to the control AP 114. The control AP 114 and/or the server(s) 112 may determine recovery data corresponding to the lost data indicated by the recovery manifest and may generate recovery data including the data that was not received by the device 102 indicated by the recovery manifest. The device 102 may then receive (136) the recovery data from the control AP 114 and may combine (138) the multicast data and the recovery data.

While FIG. 1 illustrates an example of sequential transmissions (e.g., the device 102 connects to the multicast AP 116 to receive the multicast data and then connects to the control AP 114 to receive the recovery data), the disclosure is not limited thereto and the device 102 may receive the multicast data and the recovery data using concurrent transmissions.

Figure 3A:
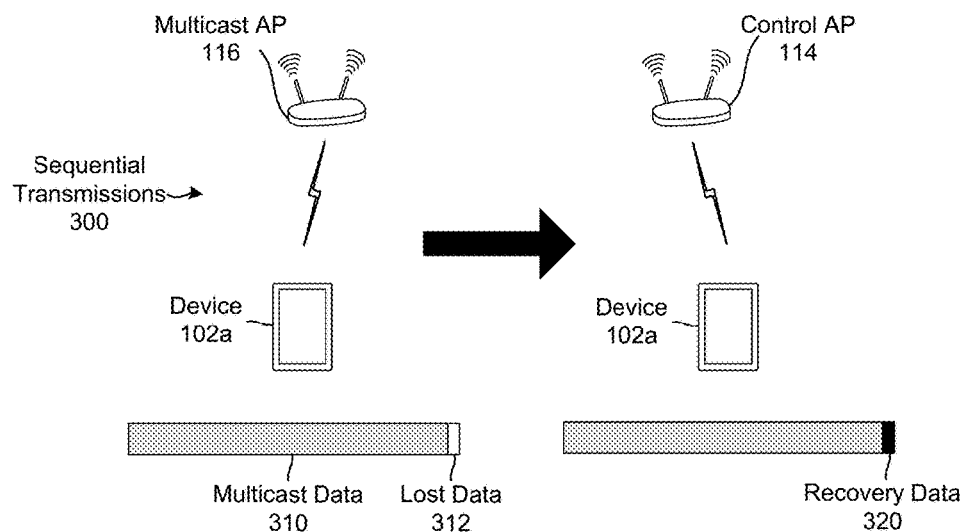
Figure 3B:
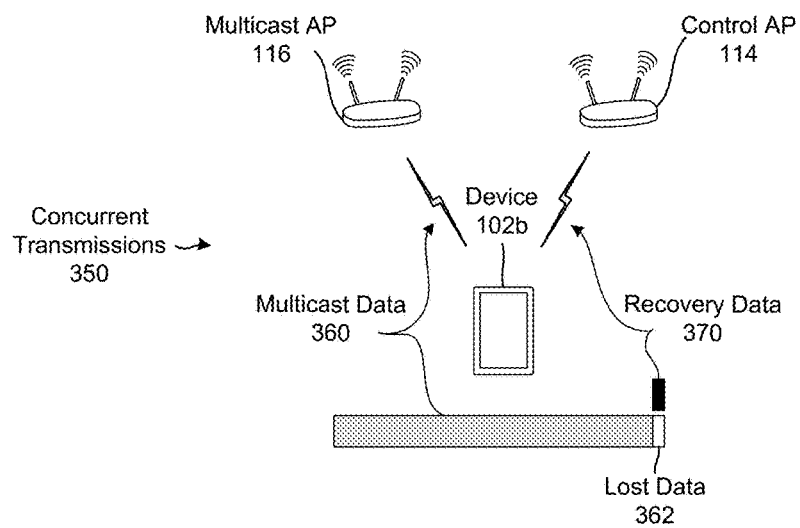

FIGS. 3A-3B illustrate examples of sequential transmissions and concurrent transmissions according to embodiments of the present disclosure. As illustrated in FIG. 3A, sequential transmissions 300 occurs when a device 102a connects to a multicast AP 116 to receive multicast data 310 and then connects to a control AP 114 to receive recovery data 320. For example, the multicast AP 116 may send the multicast data 310 to multiple devices, including device 102a. After receiving the multicast data 310 from the multicast AP 116, the device 102a may determine lost data 312 (e.g., portions of the multicast data 310 that were not received from the multicast AP 116) and may connect to the control AP 114 to request and receive recovery data 320 corresponding to the lost data 312. Thus, the device 102a first connects to the multicast AP 116 and then connects to the control AP 114.

As illustrated in FIG. 3B, concurrent transmissions 350 occurs when a device 102b connects to the control AP 114 and the multicast AP 116 concurrently and receives multicast data 360 and recovery data 370 using separate network adapters. For example, the device 102b may be connected to the multicast AP 116 using a first network adapter while connected to the control AP 114 using a second network adapter. While connected to the multicast AP 116 and the control AP 114, the device 102b may receive multicast data 360 from the multicast AP 116 and recovery data 370 from the control AP 114. For example, the multicast AP 116 may send the multicast data 360 to multiple devices 102, including the device 102b. After receiving a first portion of the multicast data 360, the device 102b may determine lost data 362 (e.g., portions of the first portion of the multicast data 360 that were not received from the multicast AP 116) and may request the lost data 362 from the control AP 114. The control AP 114 may send recovery data 370 corresponding to the lost data 362 to the device 102b while the device 102b receives a second portion of the multicast data 360. Thus, the device 102b may receive the multicast data 360 from the multicast AP 116 while receiving the recovery data 370 from the control AP 114.

FIG. 3C illustrates an example of separating functionality associated with a control AP 114 and a multicast AP 116 and sending data using multiple access points. For example, while FIGS. 3A-3B illustrate a single control AP 114 and a single multicast AP 116, FIG. 3C illustrates a plurality of control APs 114 and a plurality of multicast APs 116. As illustrated in FIG. 3C, a system 380 may include one or more control AP(s) 382 (e.g., control AP 114a), one or more recovery AP(s) 384 (e.g., control APs 114b, 114c . . . 114n) and one or more multicast AP(s) 386 (e.g., multicast APs 116a, 116b . . . 116n). The control AP(s) 382 may be in charge of directing devices 102 (e.g., device 102c) to connect to the multicast AP(s) 386 to download multicast data and/or to the recovery AP(s) 384 to download recovery data. In some examples, such as when updating firmware on the device 102c, the control AP(s) 382 may also be in charge of controlling a state of the device 102c.

The multicast AP(s) 386 may include one or more multicast APs 116 that are dedicated to sending multicast data to the devices 102. In some examples, each of the multicast APs 386 may include a portion of the overall multicast data (e.g., first multicast data stored on first multicast AP 116a is a first section of the multicast data, second multicast data stored on second multicast AP 116b is a second section of the multicast data, etc.). Thus, the control AP(s) 382 may instruct the device 102c to connect to each of the multicast APs 386 in order to receive the multicast data. In other examples, each of the multicast APs 386 may include unique multicast data (e.g., first multicast data stored on first multicast AP 116a is separate from second multicast data stored on second multicast AP 116b). Thus, the control AP(s) 382 may instruct the device 102c to connect to an individual multicast AP 386 based on the multicast data stored on the individual multicast AP 386. In some examples, one or more multicast APs 116 may exist solely for the purpose of advertising multicast data available. For example, the device 102c may connect to the multicast AP 116a to receive information regarding the multicast data stored in the system 380 that is available to the device 102c.

The recovery AP(s) 384 may include one or more control APs 114 that are dedicated to sending the recovery data to the devices 102. For example, the control AP(s) 382 may assign each device 102 to a specific recovery AP(s) 384 to receive the recovery data, with additional recovery AP(s) 384 available for additional devices 102 based on an available bandwidth. Thus, each of the recovery AP(s) 384 may connect to a maximum number of devices 102 to send the recovery data without reducing transfer rates or the like.

To illustrate an example, the device 102c may connect to the control AP(s) 382 (e.g., control AP 114a) to indicate the multicast data the device 102c would like to receive. The control AP 114a may determine which of the multicast AP(s) 386 the device 102c needs to connect to in order to receive the multicast data and may instruct the device 102c to connect to a single multicast AP 386 (e.g., multicast AP 116b). The device 102c may receive a portion of the multicast data stored on the multicast AP 116b from the multicast AP 116b. In some examples, after receiving the portion of the multicast data, the device 102c may connect to the control AP 114a to request an address of one of the recovery AP(s) 384 and the control AP 114a may assign the device 102c to one of the recovery AP(s) 384 (e.g., control AP 114c). In other examples, the control AP 114a may assign the device 102c to one of the recovery AP(s) 384 (e.g., control AP 114c) prior to the device 102c receiving the multicast data. After receiving the portion of the multicast data, the device 102c may connect to the selected recovery AP 384 (e.g., control AP 114c) to request and receive recovery data corresponding to the portions of the multicast data that were not received from the multicast AP 116b.

While each data sector may correspond to a fixed size of data (e.g., 1 KB), this is uncompressed data and the data may be compressed. Thus, the server(s) 112, control AP 114 and/or multicast AP 116 may compress the data prior to sending the data to the device 102. For example, a first data sector corresponding to a first 1 KB block of data may be compressed prior to sending to the device 102 using a first data packet, a second data sector corresponding to a second 1 KB block of data may be compressed prior to sending to the device 102 using a second data packet, and so on for each of the multicast data packets sent to the device 102. Additionally or alternatively, the server(s) 112 may generate a recovery file (e.g., recovery data) including multiple data sectors stored sequentially and the recovery file may be compressed prior to being sent to the device 102.

FIG. 4 illustrates examples of packet encapsulation for multicast transmission and unicast transmission according to embodiments of the present disclosure. As illustrated in FIG. 4, multicast packet encapsulation 410 may include a wireless header and radio information 412, an internet protocol (IP) header 414, multicast data 416 and a multicast data header 418. The multicast data header 418 may include a Magic Number 422, a sequence 424, a base sector 426 and a current sector 428. The magic number 422 may be a fixed value for all packets sent by components of the system and may have a length of four bytes. The sequence number 424 may have a length of four bytes, although the disclosure is not limited thereto, and may indicate the global sequence number of the multicast data packets. For example, the global sequence number may indicate a unique sequence number for each sector of data, beginning with a first sector of the multicast data and ending with a final sector of the multicast data. A sector of data may correspond to a fixed size of data, such as 12 bytes, although the disclosure is not limited thereto. Thus, each packet may indicate a unique sequence number corresponding to one or more sectors of data included in the packet. The base sector 426 may have a length of four bytes and may indicate the starting sector number (e.g., memory address) of each image. The current sector 428 may have a length of four bytes and may indicate the current transferred sector number (e.g., memory address) of each image. Data may be stored as a single user package including a number of images, such as a system image, a boot image, a bootloader, etc. Thus, each image included in the package may correspond to different files, with the base sector 426 identifying a beginning of each file (e.g., image) and the current sector 428 indicating a current location of the packet, which may correspond to a physical location where data included in the data packet will be stored.

Control packet encapsulation 430 may include the wireless header and radio information 412, the IP header 414, a user datagram protocol (UDP) header 432, a control packet header 434 and optional data 436. The control packet header 434 may include the Magic Number 422, a Device Serial Number (DSN) 444 and a state code 446. The DSN 444 may have a length of sixteen bytes and may indicate a device serial number with which the server(s) 112 may track the devices 102. The state code 446 may have a length of four bytes and may indicate state transition values. For example, the control AP 114 may optionally control which state the device 102 is operating in using the state code 446, for example when updating firmware on the device 102. Thus, the state code 446 indicates a current state of the device 102 and the control AP 114 may keep track of the device 102 through multiple state transitions. The optional data 436 may have a length between zero and 128 bytes and may carry a value for some of the state transitions. For example, the optional data 436 may include an address (e.g., service set identifier (SSID)) corresponding to a multicast AP 116 or other address information sent from the control AP 114 to the device 102. In some examples, the optional data 436 may include other information associated with transferring the multicast data, such as recovery data, an address associated with recovery data or other information associated with the recovery data.

In some examples, the recovery data may be sent to the device 102 using a reliable connection, such as file transfer protocol (FTP) or the like. Thus, the control AP 114 may control the device 102 by sending control data to the device 102 using the control packet encapsulation 430, but may send recovery data to the device 102 using a different protocol. For example, the device 102 may send the recovery manifest to the server(s) 112 and the server(s) 112 may generate a single file including all of the recovery data indicated by the recovery manifest. Thus, portions of multicast data that are sent as separate data packets by the multicast AP 116 may be combined into a single file that is sent by the control AP 114 to the device 102 using the reliable connection (e.g., FTP). The recovery data is encoded in sequence based on the recovery manifest so that individual sectors of data do not need a sequence number to indicate a relative position within the recovery data. In some examples the control AP 114 may include the file name, an address associated with the file or other information as the optional data 436 using the control packet encapsulation 430, enabling the device 102 to receive the file using the reliable connection (e.g., FTP). In other examples. the recovery data may be encoded as a single file and sent as the optional data 436 using the control packet encapsulation 430, although the disclosure is not limited thereto.

FIG. 5 is a communication diagram conceptually illustrating an example method for initializing multicast access points according to embodiments of the present disclosure. As illustrated in FIG. 5, server(s) 112 may detect (510) control AP(s) 114, detect (512) multicast AP1 116*a* and detect (514) multicast AP2 116*b*. For example, the control AP 114, the multicast AP1 116*a* and/or the multicast AP2 116*b* may connect to the server(s) 112 and/or register with the server(s) 112. While FIG. 5 illustrates a single control AP 114 and two multicast AP 116, the disclosure is not limited thereto and the system 100 may include multiple control APs 114 and/or multicast APs 116 without departing from the disclosure.

The server(s) 112 may determine (516) a configuration of the multicast APs 116 and may send (518) first data to the multicast AP1 116*a*. The multicast AP1 116*a* may store (520) the first data in a first storage device attached to the multicast AP1 116*a*. The server(s) 112 may send (522) second data to the multicast AP2 116*b* and the multicast AP2 116*b* may store (524) the second data in a second storage device attached to the multicast AP2 116*b*. Thus, while typically access points only store data temporarily while sending the data to or from the device 102, the multicast APs 116 may include a storage device and store data in the storage device until the server(s) 112 send new data to store.

Figure 6:
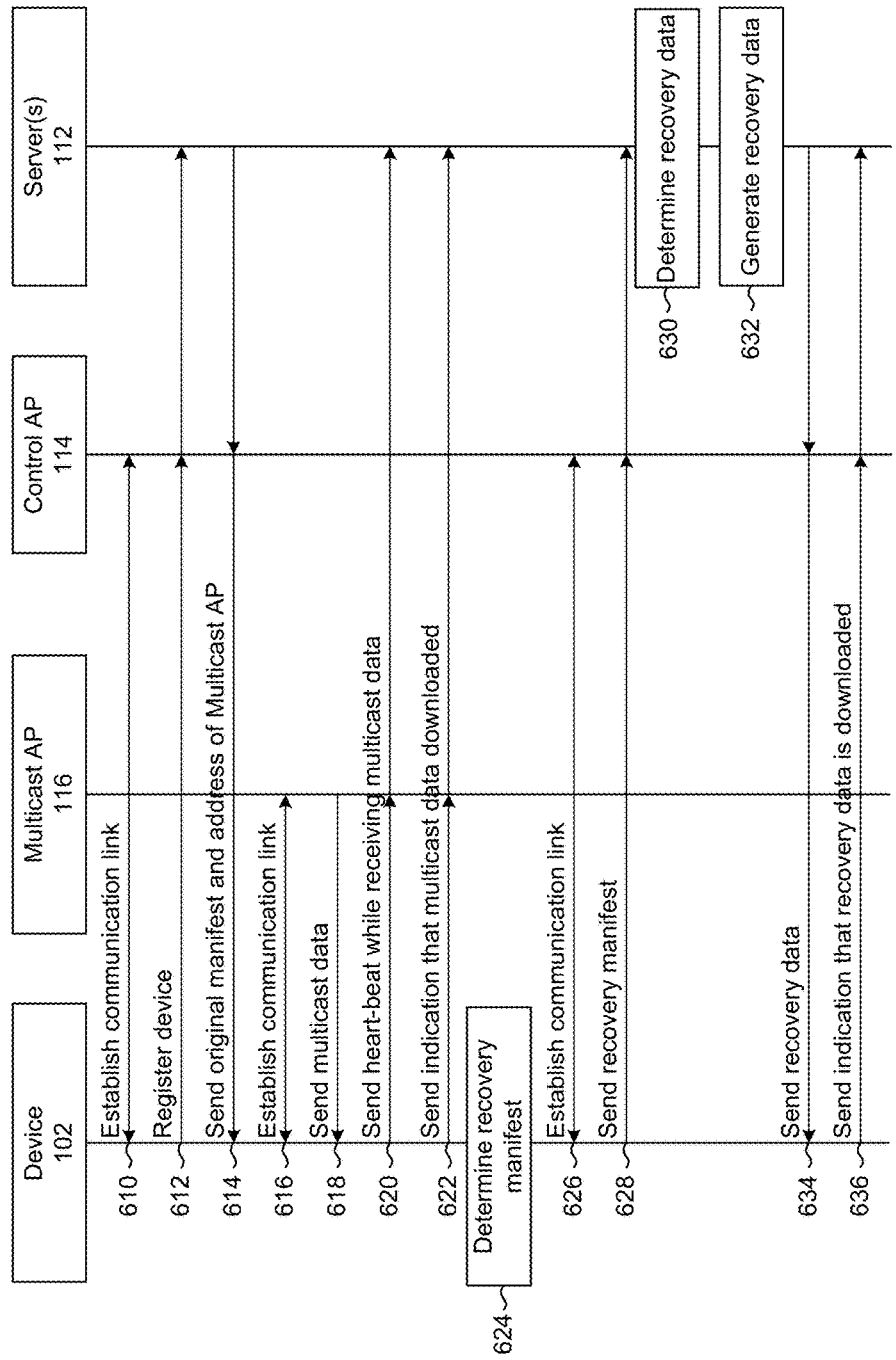
FIG. 6 is a communication diagram conceptually illustrating an example method for sending multicast data and recovery data according to embodiments of the present disclosure.

FIG. 6 is a communication diagram conceptually illustrating an example method for sending multicast data and recovery data according to embodiments of the present disclosure. As illustrated in FIG. 6, the device 102 may establish (610) a communication link with the control AP 114 and may register (612) the device 102 with the server(s) 112 via the control AP 114. The control AP 114 and/or the server(s) 112 (via the control AP 114) may send (614) an original manifest of multicast data and an address of a multicast AP 116 with which to establish a communication link to receive the multicast data.

The original manifest may be a bitmap corresponding to the multicast data. Thus, bits in the bitmap may correspond to portions of the multicast data, such as a memory address or sequence number or the like. The device 102, control AP 114 and/or the server(s) 112 may use the original manifest to determine bits to be sent to the device 102. For example, the original manifest sent by the control AP 114 to the device 102 may store values of "1" to indicate specific bits that are included in the multicast data and may store values of "0" to indicate specific bits that are not included in the multicast data. For new content to store on the device 102, all of the bits in the original manifest may have a value of "1," indicating that the multicast data includes these bits. The device 102 may receive the multicast data and determine bits that were not received by the device 102, which may be indicated in a recovery manifest. For updated content, such as updating a firmware or the like, the original manifest may correspond to physical memory addresses of solid-state storage and the original manifest may indicate bits (e.g., physical memory addresses) that are updated. Thus, the original manifest may include bits having a value of "0" for the bits left unchanged and bits having a value of "1" for the bits included in the multicast data to be updated. In this example, the device 102 may receive the multicast data and determine bits that were indicated by the original manifest (e.g., value of "1") but were not received by the device 102, which may be indicated in a recovery manifest.

The device 102 may establish (616) a communication link with the multicast AP 116 indicated by the address and the multicast AP 116 may send (618) multicast data to the device 102 via the communication link. While FIG. 6 only illustrates the multicast AP 116 sending the multicast data to the device 102, the multicast AP 116 may be simultaneously sending the multicast data to additional devices 102 not illustrated in FIG. 6.

While the device 102 is receiving the multicast data, the device 102 may send (620) a heart-beat indication to the server(s) 112 via the multicast AP 116 or using other means known to one of skill in the art. The heart-beat indication indicates to the server(s) 112 that the device 102 is still downloading the multicast data and is not in an error state or the like. Once the device 102 has finished receiving the multicast data, the device 102 may send (622) an indication that the multicast data has been downloaded.

As discussed above, the device 102 may determine (624) a recovery manifest. For example, the device 102 may indicate data packets received as part of the multicast data, such as by setting a value of a corresponding bit in the original manifest to a value of "0." As each of the data packets received as part of the multicast data is indicated in the recovery manifest by setting a value of a corresponding bit to a value of "0," the recovery manifest indicates lost data that was sent by the multicast AP 116 but not received by the device 102.

The device 102 may establish (626) a communication link with the control AP 114 and may send the recovery manifest to the server(s) 112 via the control AP 114. The server(s) 112 may determine (630) recovery data indicated by the recovery manifest and may generate (632) the recovery data. For example, the server(s) 112 may identify discrete portions of the multicast data that were not received by the device 102 and may generate the recovery data as a single digital file (e.g., binary or the like) including the discrete portions of the multicast data. The server(s) 112 may send (634) the recovery data to the device 102 via the control AP 114 and the device 102 may send (636) an indication that the recovery data has been downloaded. By adding the recovery data to the multicast data, the device 102 may recover the lost data that was not received from the multicast AP 116.

In some examples, the recovery data may be sent to the device 102 in step 634 using a reliable connection, such as file transfer protocol (FTP) or the like. For example, the device 102 may send the recovery manifest to the server(s) 112 and the server(s) 112 may generate a single file including all of the recovery data indicated by the recovery manifest. Thus, portions of multicast data that are sent as separate data packets by the multicast AP 116 may be combined into a single file that is sent by the control AP 114 to the device 102 using the reliable connection (e.g., FTP). The recovery data is encoded in sequence based on the recovery manifest so that individual sectors of data do not need a sequence number to indicate a relative position within the recovery data. In some examples the control AP 114 may include the file name, an address associated with the file or other information as the optional data 436 using the control packet encapsulation 430, enabling the device 102 to receive the file using the reliable connection (e.g., FTP). In other examples, the recovery data may be encoded as a single file and sent as the optional data 436 using the control packet encapsulation 430, although the disclosure is not limited thereto.

Figure 7:
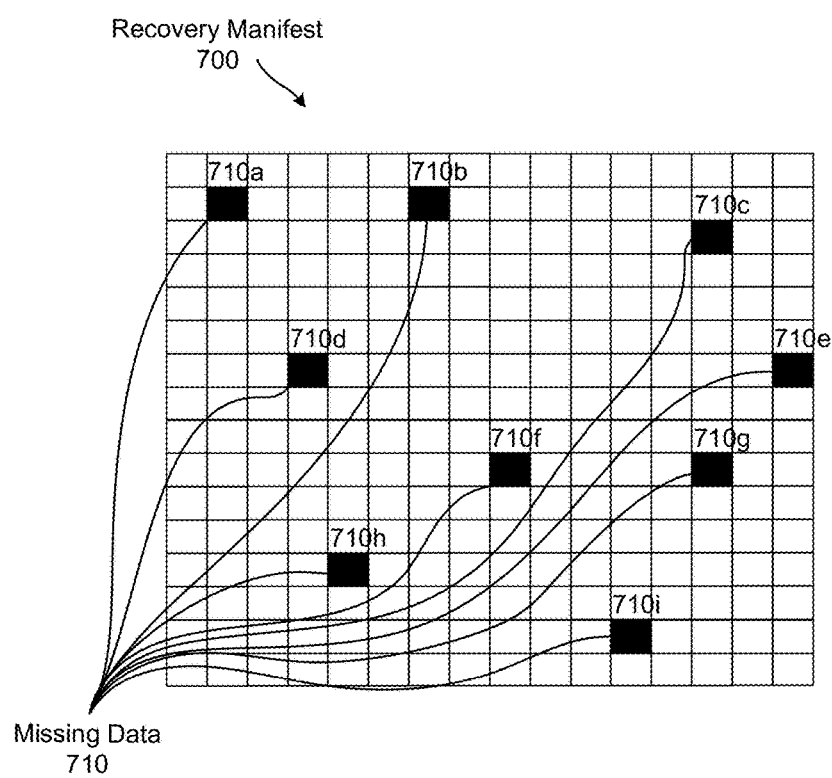
FIG. 7 illustrates an example of a recovery manifest and recovery data according to embodiments of the present disclosure.

FIG. 7 illustrates an example of a recovery manifest and recovery data according to embodiments of the present disclosure. FIG. 7 illustrates an example of a recovery manifest 700 as a bitmap indicating missing data 710 that was sent by the multicast AP 116 but not received by the device 102. As illustrated in FIG. 7, the missing data 710 is indicated by values of "1" (e.g., black), whereas the multicast data received by the device 102 is indicated by values of "0" (e.g., white). After receiving the recovery manifest 700 from the device 102, the server(s) 112 may generate recovery data 720, which includes each of the bits of missing data 710 (e.g., 710a-710i). Thus, the server(s) 112 generates the recovery data 720 using multiple portions of the multicast that may be disparate.

While FIG. 7 illustrates the recovery manifest as a bitmap, the disclosure is not limited thereto. Instead, the original manifest and the recovery manifest may be stored in other formats or may be illustrated in other forms. Additionally or alternatively, a logical block size of the original/recovery manifest may vary. For example, the logical block size corresponding to image data and/or firmware data may be 1 KB, whereas the logical block size corresponding to video data may be 4 KB. As a wireless payload of a data packet may be limited to 2 KB in some technologies, the original/recovery manifest may need to identify the multicast/recovery data using other techniques to enable precise identification of data sectors within a logical block.

While each data sector may correspond to a fixed size of data (e.g., 1 KB), this is uncompressed data and the data may be compressed. Thus, the server(s) 112, control AP 114 and/or multicast AP 116 may compress the data prior to sending the data to the device 102. For example, a first data sector corresponding to a first 1 KB block of data may be compressed prior to sending to the device 102 using a first data packet, a second data sector corresponding to a second 1 KB block of data may be compressed prior to sending to the device 102 using a second data packet, and so on for each of the multicast data packets sent to the device 102. Additionally or alternatively, the server(s) 112 may generate a recovery file (e.g., recovery data) including multiple data sectors stored sequentially and the recovery file may be compressed prior to being sent to the device 102.

Figure 8:
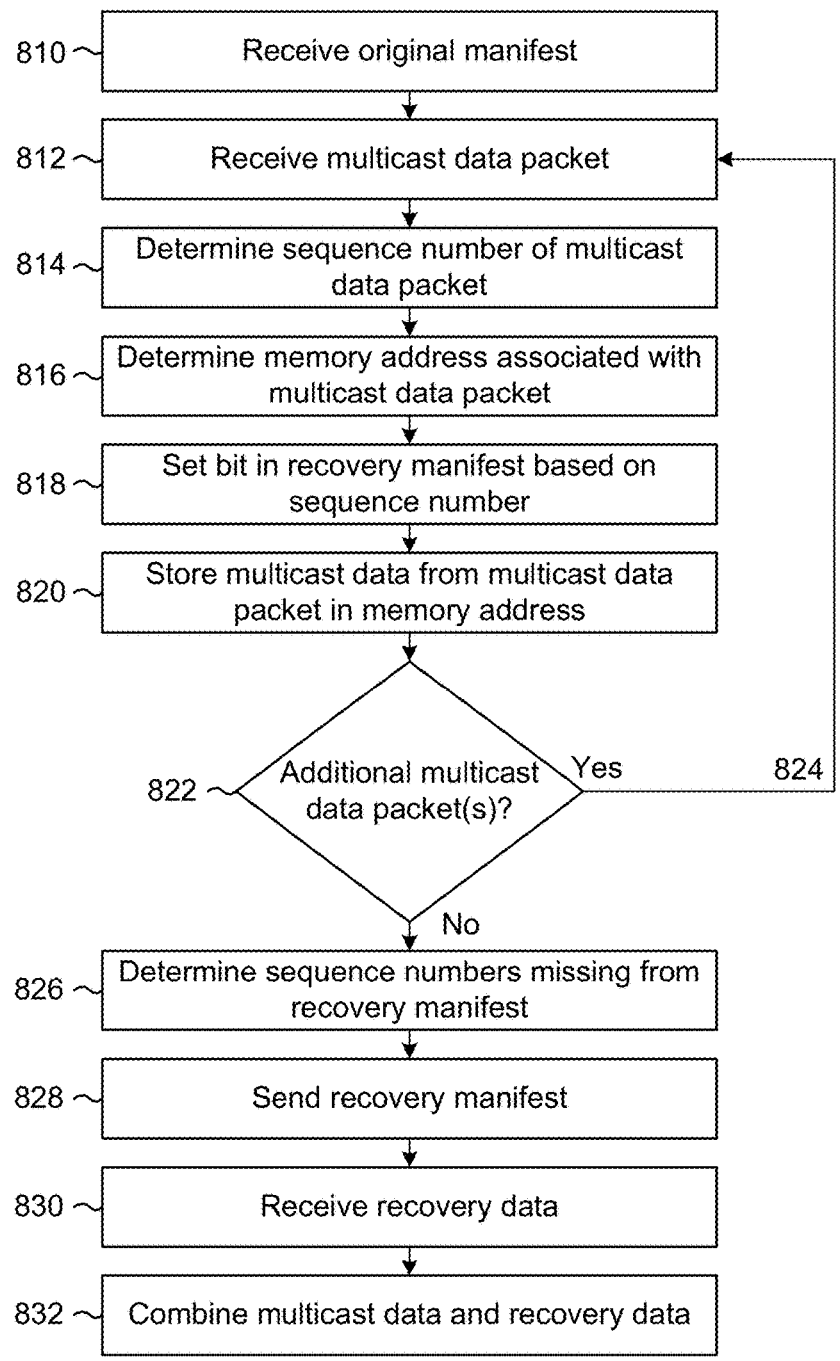
FIG. 8 is a flowchart conceptually illustrating an example method for generating a recovery manifest and receiving recovery data according to embodiments of the present disclosure.

FIG. 8 is a flowchart conceptually illustrating an example method for generating a recovery manifest and receiving recovery data according to embodiments of the present disclosure. As illustrated in FIG. 8, the device 102 may receive (810) an original manifest corresponding to a bitmap of multicast data.

The device 102 may receive (812) a multicast data packet, may determine (814) a sequence number of the multicast data packet, determine (816) a memory address associated with the multicast data packet, set (818) a bit in a recovery manifest based on the sequence number and store (820) multicast data from the multicast data packet in the memory address. For example, the device 102 may determine the sequence number and the memory address using the multicast packet encapsulation 410 discussed above with regard to FIG. 4.

The device 102 may determine (822) if there are additional multicast data packet(s) and, if so, may loop (824) to step 812 and repeat steps 812-820 for the additional multicast data packet(s). If there are no additional data packets, the device 102 may determine (826) sequence numbers missing from the recovery manifest (e.g., lost data that was included in the original manifest and sent by the multicast AP 116 but not received by the device 102) and send (828) the recovery manifest to the server(s) 112 via the control AP 114. The device 102 may receive (830) recovery data from the server(s) 112 via the control AP 114 and may combine (832) the multicast data and the recovery data to recover the lost data.

FIG. 9 is a communication diagram conceptually illustrating an example method for sending multicast data and recovery data simultaneously according to embodiments of the present disclosure. As illustrated in FIG. 9, the device 102 may establish (910) a first communication link with the control AP 114 and may register (912) the device 102 with the server(s) 112 via the control AP 114. The control AP 114 and/or the server(s) 112 via the control AP 114 may send (914) an original manifest and address of a multicast AP 116 to the device 102. The device 102 may establish (916) a second communication link with the multicast AP 116 and the multicast AP 116 may send (918) first multicast data to the device 102. After receiving at least a portion of the first multicast data, the device 102 may determine (920) a first recovery manifest by comparing the first multicast data received by the device 102 to the original manifest sent by the control AP 114 and may send the first recovery manifest to the server(s) 112 via the control AP 114.

The server(s) 112 may determine (924) first recovery data using the first recovery manifest, may generate (926) the first recovery data and may send (928) the first recovery data to the device 102. The device 102 may combine (930) the first multicast data and the first recovery data to recover the lost data. The multicast AP 116 may send (932) second multicast data to the device 102, as the device 102 already has the address (e.g., SSID) of the multicast AP 116 from receiving the first multicast data. While FIG. 9 illustrates the device 102 receiving the second multicast data after performing steps 920-930, the disclosure is not limited thereto and the device 102 may receive the second multicast data while determining the first recovery manifest, receiving the first recovery data and/or combining the first multicast data and the first recovery data. Thus, the device 102 may receive recovery data from the control AP 114 using the first communication link (e.g., first network adapter) while receiving multicast data from the multicast AP 114 using the second communication link (e.g., second network adapter).

While FIGS. 6-9 illustrate the device 102 recovering the lost data using recovery data received from the control AP 114, the disclosure is not limited thereto. Instead, the device 102 may recover the lost data using redundant bits included in the multicast data (e.g., multicast AP 116 sends bits multiple times (e.g., duplicate bits) in order to enable error correction) and/or using second multicast data received from a second multicast AP 116 after a time delay.

FIGS. 10A-10C illustrate examples of transmitting duplicate multicast data to recover lost data according to embodiments of the present disclosure. As illustrated in FIG. 10A, a multicast AP 116a may send multicast data 1010 including duplicate bits 1012. For example, the multicast AP 116a may send a first series of bits (e.g., 1, 2, 3) twice before sending a second series of bits (e.g., 4, 5, 6) twice. By including the duplicate bits 1012, the device 102 may recover lost data from the multicast AP 116a.

Additionally or alternatively, a multicast AP 116b may send multicast data 1020 including repetitive transmissions 1022 as illustrated in FIG. 10B. For example, the multicast AP 116b may send an entire series of bits intended for the device 102 (e.g., 1-6) before retransmitting the entire series of bits a second time. By including the repetitive transmissions 1022, the device 102 may recover lost data from the multicast AP 116b.

While FIGS. 10A-10B illustrate the multicast APs 116a/116b sending bits twice, the disclosure is not limited thereto and the multicast APs 116a/116b may send bits three or more times without departing from the disclosure. Additionally or alternatively, the multicast APs 116a/116b may send duplicate bits, as illustrated in FIG. 10A, while retransmitting the entire series of bits a second time, as illustrated in FIG. 10B.

FIG. 10C illustrates an example of multicast data being sent by two multicast APs 116c/116d. Instead of connecting to the multicast AP 116 and the control AP 114 simultaneously, the device 102 may connect to the multicast APs 116c/116d simultaneously. For example, multicast AP 116c may send first multicast data 1030a and multicast AP 116d may send second multicast data 1030b after a transmission delay 1032. The first multicast data 1030a and the second multicast data 1030b may be identical other than the transmission delay 1032, enabling the device 102 to recover lost data from the first multicast data 1030a (e.g., data not received from the multicast AP 116c) using the second multicast data 1030b. For example, if the device 102 failed to receive a portion of the first multicast data 1030a from the multicast AP 116c (e.g., bit 1), the device 102 may recover the lost data using the second multicast data 1030b received from the multicast AP 116d (e.g., bit 1, after the transmission delay 1032).

There are several potential benefits from sending the first multicast data 1030a using the multicast AP 116c and sending the second multicast data 1030b using the multicast AP 116d. As a first example, the device 102 may receive the second multicast data 1030b soon after the first multicast data 1030a, enabling the device 102 to recover the lost data in real-time without a delay caused by identifying the lost data and requesting recovery data from the control AP 114. Thus, for applications such as streaming content (e.g., audio and/or video), real-time multiplayer videogames, voice over internet protocol (VoIP) or the like that prioritize latency over reliability, the recovery data may be obtained without additional processing and/or transmission delays between the device 102 and the server(s) 112. As a second example, the multicast AP 116d may send the second multicast data 1030b to multiple devices using all of the available bandwidth, enabling the multicast APs 116c/116d to send the multicast data 1030 to a large number of devices 102 without reducing transfer rates. In contrast, as the control AP 114 sends recovery data to the devices 102 individually (e.g., unicast transmission), the control AP 114 may only send recovery data to a finite number of devices 102 before reducing transfer rates between the control AP 114 and the devices 102.

While FIGS. 10A-10B illustrate sending duplicate bits 1012, repetitive transmissions 1022 or second multicast data 1030b as separate examples, the disclosure is not limited thereto and the system 100 may use a combination thereof. For example, the second multicast data 1030b may include a unique series of bits (e.g., each bit is sent once), duplicate bits 1012 (e.g., each series of bits are sent two or more times) and/or repetitive transmissions 1022 (e.g., the entire series of bits are transmitted two or more times in succession) without departing from the present disclosure. In some examples, despite the duplicate bits 1012, repetitive transmissions 1022 and/or second multicast data 1030b, the device 102 may not receive all of the multicast data 1010/1020/1030. Therefore, the device 102 may identify the lost data, generate a recovery manifest, connect to a control AP 114, send the recovery manifest to the control AP 114 and receive recovery data from the control AP 114 as discussed above with regard to FIGS. 6-8.

While FIG. 10C illustrates the system 100 sending identical multicast data using two multicast APs 116, the disclosure is not limited thereto. Additionally or alternatively, the system 100 may send unique multicast data using two or more multicast APs 116. As a first example, individual multicast APs 116 may send portions of the overall multicast data to be sent to the device 102. For example, firmware data may be broken into multiple portions and the device 102 may connect to multiple multicast APs 116 to download each of the multiple portions. As a second example, individual multicast APs 116 may send different multicast data and the device 102 may connect to one of the multicast APs 116 to receive the unique multicast data. For example, each of the multicast APs 116 may send a channel of streaming content and the device 102 may switch between the channels by connecting to a different multicast AP 116.

Figure 11A:
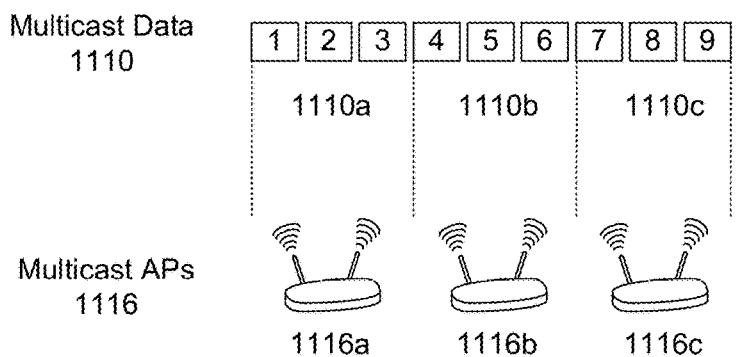
FIGS. 11A-11B illustrate examples of transmitting multicast data using multiple multicast access points according to embodiments of the present disclosure.
Figure 11B:
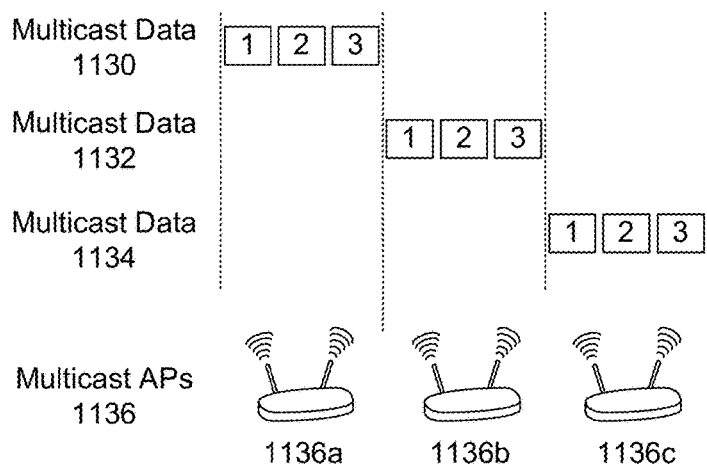

FIGS. 11A-11B illustrate examples of transmitting multicast data using multiple multicast access points according to embodiments of the present disclosure. As illustrated in FIG. 11A, the system 100 may split multicast data 1110 into separate portions and store each of the separate portions on an individual multicast AP 1116. For example, a first multicast AP 1116a may store a first portion 1110a of the multicast data 1110, a second multicast AP 1116b may store a second portion 1110b of the multicast data 1110 and a third multicast AP 1116c may store a third portion 1110c of the multicast data 1110. Thus, to receive the multicast data 1110, the device 102 may connect to each of the multicast APs 1116 individually. The device 102 may connect to the multicast APs 1116 in succession and/or in order, but the disclosure is not limited thereto. Instead, the device 102 may connect to the multicast APs 1116 in any order and at any time without departing from the disclosure. After receiving the multicast data 1110 from the multicast APs 116, the device 102 may identify lost data, generate a recovery manifest, connect to a control AP 114, send the recovery manifest to the control AP 114 and receive recovery data from the control AP 114 as discussed above with regard to FIGS. 6-8. Additionally or alternatively, the device 102 may connect to each of the multicast APs 116 while connected to the control AP 114 in order to receive the recovery data in substantially real-time as discussed above with regard to FIG. 9.

As illustrated in FIG. 11B, the system 100 may store unique multicast data 1130/1132/1134 on an individual multicast AP 1136. For example, a first multicast AP 1136a may store first multicast data 1130, a second multicast AP 1136b may store second multicast data 1132 and a third multicast AP 1136c may store third multicast data 1134. Thus, the device 102 may connect to the multicast APs 1136 based on the multicast data 1130/1132/1134 the device 102 would like to receive. For example, the device 102 may connect to the first multicast AP 1136a, receive the first multicast data 1130 (e.g., first channel of streaming digital content) and display the first multicast data 1130 on a display (e.g., television). The device 102 may then connect to the second multicast AP 1136b, receive the second multicast data 1132 (e.g., second channel of streaming digital content) and display the second multicast data 1132 on the display. Thus, changing channels of the streaming content corresponds to connecting to individual multicast APs 1136.

FIG. 12 illustrates an example of a neighborhood broadcast implementation according to embodiments of the present disclosure. As illustrated in FIG. 12, a neighborhood 1200 may include a number of houses 1202 and a neighborhood broadcast station 1210. The neighborhood broadcast station 1210 may include a control AP 114 and a plurality of multicast APs 116 (e.g., multicast AP1 116a, multicast AP2 116b, multicast APn 116n), enabling the neighborhood broadcast station 1210 to send a plurality of digital content (e.g., streaming content or the like) to each of the houses 1202 within a broadcast range of the neighborhood broadcast station 1210. The houses 1202 may include an entertainment system 1220, such as a device 102 (e.g., cable box, router, desktop computer, laptop computer, server, video game console or the like) connected to a television 1222. While FIG. 12 illustrates the entertainment system 1220 including a discrete device 102 separate from the television 1222, the disclosure is not limited thereto and the device 102 may be included as part of the television 1222 such that the television 1222 may be capable of receiving the multicast data directly. Additionally or alternatively, the house 1202b may include additional devices 102 that are not connected to the television 1222 but are capable of receiving the multicast data and displaying the digital content.

By connecting to the neighborhood broadcast station 1210, the entertainment system 1220 and/or device 102 may receive digital content and display the digital content to a user. For example, the device 102 may connect to the multicast AP1 116a to receive a first channel of digital content and may connect to the multicast AP2 116b to receive a second channel of digital content. Thus, the device 102 may receive the digital content using wireless networks that are local to the neighborhood 1200 instead of receiving the digital content using other internet connections (e.g., dial-up internet, broadband internet, cable internet, digital subscriber line (DSL), satellite internet or the like) and/or typical broadcast techniques (e.g., over-the-air antennas, cable television, satellite television or the like).

The number of multicast APs 116 in the neighborhood broadcast station 1210 may be determined based on an available frequency spectrum. For example, if the available frequency spectrum is limited to ten channels, the neighborhood broadcast station 1210 may include a single control AP 114 and up to nine multicast APs 116. However, if the available frequency spectrum is increased (e.g., 60 GHz spectrum), the number of multicast APs 116 may be increased accordingly. Therefore, the neighborhood broadcast station 1210 may be capable of sending a plurality of unique digital content, such as 100 unique channels of digital content.

In some examples, each channel of digital content may correspond to a unique movie. Therefore, the system 100 may identify a plurality (e.g., 5-100, although the disclosure is not limited thereto) of the most popular movies and may broadcast the plurality of movies using the neighborhood broadcast station 1210. The system 100 may identify the plurality of movies based on all-time popularity, current popularity, recent release dates or the like. The individual movies included in the plurality of movies may be rotated on a regular basis, such as daily, weekly, monthly, etc.

In some examples, the device 102 may receive the digital content from the neighborhood broadcast station 1210 as streaming content. For example, the device 102 may connect to the multicast AP1 116a and receive first digital content mid-stream, such as partway through a movie. The device 102 may cache and display the first digital content without storing the first digital content. Thus, when the device 102 connects to the multicast AP2 116b, the first digital content is discarded and the device 102 may receive and display second digital content mid-stream. However, the disclosure is not limited thereto and the device 102 may receive the digital content from the neighborhood broadcast station 1210 in its entirety. For example, the device 102 may connect to the multicast AP1 116a and receive the first digital content in its entirety and may display the first digital content from a beginning. In this example, changing channels may result in a delay as the device 102 receives the first digital content in its entirety prior to displaying the first digital content from the beginning.

Additionally or alternatively, the device 102 may automatically download a plurality of digital content from the neighborhood broadcast station 1210 and temporarily store the plurality of digital content for viewing. For example, the device 102 may select a portion of the plurality of movies broadcast by the neighborhood broadcast station 1210 and may receive and store the portion of the plurality of movies. Thus, the device 102 may display individual movies included in the portion of the plurality of movies without a delay associated with connecting to the neighborhood broadcast station 1210 and receiving the digital content. The device 102 and/or system 100 may select the portion of the plurality of movies based on user preferences, previous viewing history, popularity, recent releases or the like. When an individual movie is removed from the neighborhood broadcast station 1210 (e.g., no longer broadcast by the neighborhood broadcast station 1210), the device 102 may discard the stored digital content and receive second digital content associated with a new movie.

While the examples illustrated above describe the digital content as being movies, the disclosure is not limited thereto. Instead, the digital content may be any audio content and/or video content, such as music, audio books, audio programs, podcasts, television shows, video clips or the like. Additionally or alternatively, the digital content may be data such as firmware, computer programs or the like without departing from the disclosure.

FIG. 13 is a block diagram conceptually illustrating example components of the system 100. In operation, the system 100 may include computer-readable and computer-executable instructions that reside on the device 102, the server(s) 112, the control AP 114 and/or the multicast AP 116, as will be discussed further below.

The device 102/server(s) 112/control AP 114/multicast AP 116 may include an address/data bus 1302 for conveying data among components of the device 102/server(s) 112/ control AP 114/multicast AP 116. Each component within the device 102/server(s) 112/control AP 114/multicast AP 116 may also be directly connected to other components in addition to (or instead of) being connected to other components across the bus 1302.

The device 102/server(s) 112/control AP 114/multicast AP 116 may include one or more controllers/processors 1304, that may each include a central processing unit (CPU) for processing data and computer-readable instructions, and a memory 1306 for storing data and instructions. The memory 1306 may include volatile random access memory (RAM), non-volatile read only memory (ROM), non-volatile magnetoresistive (MRAM) and/or other types of memory. The device 102/server(s) 112/control AP 114/multicast AP 116 may also include a data storage component 1308, for storing data and controller/processor-executable instructions (e.g., instructions to perform the algorithms illustrated in FIGS. 1, 5, 6, 8 and/or 9). The data storage component 1308 may include one or more non-volatile storage types such as magnetic storage, optical storage, solid-state storage, etc. The device 102/server(s) 112/control AP 114/multicast AP 116 may also be connected to removable or external non-volatile memory and/or storage (such as a removable memory card, memory key drive, networked storage, etc.) through the input/output device interfaces 1302.

Computer instructions for operating the device 102/server(s) 112/control AP 114/multicast AP 116 and its various components may be executed by the controller(s)/processor(s) 1304, using the memory 1306 as temporary "working" storage at runtime. The computer instructions may be stored in a non-transitory manner in non-volatile memory 1306, storage 1308, or an external device. Alternatively, some or all of the executable instructions may be embedded in hardware or firmware in addition to or instead of software.

The device 102/server(s) 112/control AP 114/multicast AP 116 includes input/output device interfaces 1310. A variety of components may be connected through the input/output device interfaces 1310, such as a network adapter 1312. The network adapter 1312 may connect to one or more networks 1399 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1399, the system 100 may be distributed across a networked environment. The input/output device interfaces 1310 may also include an interface for an external peripheral device connection such as universal serial bus (USB), FireWire, Thunderbolt or other connection protocol.

The device 102/server(s) 112/control AP 114/multicast AP 116 further includes a transmission module 1324 configured to control the device 102/server(s) 112/control AP 114/multicast AP 116 as disclosed above with regard to FIGS. 1, 5, 6, 8 and/or 9.

The device 102/server(s) 112/control AP 114/multicast AP 116 may include overlapping components. The components of the device 102/server(s) 112/control AP 114/multicast AP 116 as illustrated in FIG. 13 are exemplary, and may be stand-alone devices or may be included, in whole or in part, as components of a larger device or system.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the Acoustic Echo Canceller 108 may be implemented by a digital signal processor (DSP).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for downloading and recovering multicast data by a mobile device, the method comprising:
    establishing a first wireless communication link between the mobile device and a control access point, the control access point communicatively coupled to a server;
    sending a registration request to the server via the control access point, the registration request indicating an identity of the mobile device;
    receiving a first bitmap corresponding to multicast data to be broadcasted by a multicast access point, the first bitmap including first entries corresponding to a first portion of the multicast data and second entries corresponding to a second portion of the multicast data;
    receiving a network address of the multicast access point, the multicast access point communicatively coupled to the server and storing the multicast data;
    terminating the first wireless communication link;
    after the first wireless communication link has been terminated, establishing, using the network address, a second wireless communication link between the mobile device and the multicast access point;
    receiving, from the multicast access point, the first portion of the multicast data;
    determining that the first portion of the multicast data does not include multicast data corresponding to the second entries in the first bitmap;
    determining, based at least in part on determining that the first portion of the multicast data does not include data corresponding to the second entries, that the second portion of the multicast data was not received by the mobile device;

creating a second bitmap corresponding to the multicast data and indicative of the second portion of the multicast data;

terminating the second wireless communication link;

after the second wireless communication link has been terminated, establishing a third wireless communication link between the mobile device and the control access point;

sending the second bitmap to the control access point; and receiving, from the control access point, the second portion of the multicast data.

2. The computer-implemented method of claim 1, further comprising: receiving, from the multicast access point, a first data packet included in the first portion of the multicast data; determining a sequence number associated with the first data packet; determining a memory address corresponding to the first data packet; modifying a value in the second bitmap corresponding to the sequence number to indicate reception of the first data packet; and storing data included in the first data packet in the memory address.

3. The computer-implemented method of claim 1, further comprising: generating combined data by combining the first portion of the multicast data and the second portion of the multicast data; displaying, on a display and using the combined data, first content; requesting, from the control access point, second content; receiving a third bitmap corresponding to second multicast data to be sent by a second multicast access point; receiving a second network address of the second multicast access point, the second multicast access point communicatively coupled to the server and storing the second multicast data, the second multicast data corresponding to the second content; receiving, from the second multicast access point, a first portion of the second multicast data; receiving, from the control access point, a second portion of the second multicast data; generating second combined data by combining the first portion of the second multicast data and the second portion of the second multicast data; and displaying, on the display and using the second combined data, the second content.

4. The computer-implemented method of claim 1, further comprising, by the server: receiving, from the mobile device via the control access point, the second bitmap; determining that a first bit of the second bitmap indicates that first data was not received by the mobile device; determining the first data; determining that a second bit of the second bitmap indicates that second data was not received by the mobile device; determining the second data: generating, from the second bitmap, recovery data corresponding to the second portion of the multicast data, the recovery data including the first data and the second data; and sending the recovery data to the mobile device via the control access point.

5. A computer-implemented method, comprising, by a device:

establishing a first wireless communication link between the device and a first access point;

receiving, from the first access point, a first bitmap corresponding to first data to be sent by a second access point, the second access point storing the first data, the first bitmap including first entries corresponding to a first portion of the first data and second entries corresponding to a second portion of the first data;

receiving, from the first access point via the first wireless communication link, a network address of the second access point;

after the first wireless communication link has been terminated, establishing, using the network address, a second wireless communication link between the device and the second access point;

receiving, from the second access point via the second wireless communication link, the first portion of the first data;

determining that the first portion of the first data does not include data corresponding to the second entries in the first bitmap;

determining, based at least in part on determining that the first portion of the first data does not include data corresponding to the second entries, that the second portion of the first data was not received by the device;

creating a second bitmap corresponding to the first data and indicative of the second portion of the first data;

after the second wireless communication link has been terminated, establishing a third wireless communication link between the device and the first access point;

sending the second bitmap to the first access point via the third wireless communication link; and receiving, from the first access point, the second portion of the first data.

6. The computer-implemented method of claim 5, further comprising: receiving, from the second access point at a first time, the first portion of the first data; determining that a third portion of the first data was not received by the device; receiving, from a third access point at a second time after the first time, the first portion of the first data; receiving, from the third access point at a third time after the first time, the third portion of the first data.

7. The computer-implemented method of claim 5, further comprising: receiving a third bitmap corresponding to second data to be sent by a third access point, the third access point storing the second data, and the third bitmap including third entries corresponding to a first portion of the second data and fourth entries corresponding to a second portion of the second data; receiving, from the third access point, the first portion of the second data; determining that the first portion of the second data does not include data corresponding to the fourth entries in the third bitmap; determining, based at least in part on determining that the first portion of the second data does not include data corresponding to the fourth entries, that the second portion of the second data was not received by the device; creating a fourth bitmap corresponding to the second data and indicative of the second portion of the second data; sending the fourth bitmap to the first access point; receiving, from the first access point, the second portion of the second data; and generating combined data by combining the first portion of the first data, the second portion of the first data, the first portion of the second data and the second portion of the second data.

8. The computer-implemented method of claim 5, further comprising: generating combined data by combining the first portion of the first data and the second portion of the first data; displaying, on a display and using the combined data, first content; receiving a third bitmap corresponding to second data to be sent by a third access point, the third access point storing the second data, and the third bitmap including third entries corresponding to a first portion of the second data and fourth entries corresponding to a second portion of the second data; receiving, from the third access point, the first portion of the second data; determining that the first portion of the second data does not include data corresponding to the fourth entries in the third bitmap; determining, based at least in part on determining that the first portion of the second data does not include data corresponding to the fourth entries, that the second portion of the second data was not received by the device; creating a fourth bitmap corresponding to the second data and indicative of the second portion of the second data; sending the fourth bitmap to the first access point; receiving, from the first access point, the second portion of the second data; generating second combined data by combining the first portion of the second data and the second portion of the second data; and displaying, on the display and using the second combined data, second content.

9. A computer-implemented method, comprising, by a device:
- receiving, from a first access point and via a first wireless communication link between the device and the first access point, a first bitmap corresponding to first data to be sent by a second access point, the second access point storing the first data, wherein:
  - the first bitmap includes first entries corresponding to a first portion of the first data and second entries corresponding to a second portion of the first data,
  - the first data corresponds to firmware stored in solid-state storage of the device and includes a first portion and a second portion,
  - a first bit of the first bitmap corresponds to a first memory address of the solid-state storage,
  - the first bit of the first bitmap has a first value to indicate that the first data does not correspond to the first memory address,
  - a second bit of the first bitmap corresponds to a second memory address of the solid-state storage, and
  - the second bit of the first bitmap has a second value to indicate that that first data corresponds to the second memory address;
- after the first wireless communication link has been terminated, establishing a second wireless communication link between the device and the second access point;
- receiving, from the second access point via the second wireless communication link, the first portion of the first data; determining that the first portion of the first data does not include data corresponding to the second entries in the first bitmap;
- determining, based at least in part on determining that the first portion of the first data does not include data corresponding to the second entries, that the second portion of the first data was not received by the device;
- creating a second bitmap corresponding to the first data and indicative of the second portion of the first data;
- after the second wireless communication link has been terminated, establishing a third wireless communication link between the device and the first access point;
- sending the second bitmap to the first access point via the third wireless communication link; and
- receiving, from the first access point, the second portion of the first data.

10. A computer-implemented method, comprising, by a device:
- receiving, from a first access point and via a first wireless communication link between the device and the first access point, a first bitmap corresponding to first data to be sent by a second access point, the second access point storing the first data, and the first bitmap including first entries corresponding to a first portion of the first data and second entries corresponding to a second portion of the first data;
- after the first wireless communication link has been terminated, establishing a second wireless communication link between the device and the second access point;
- receiving, from the second access point via the second wireless communication link, a first data packet corresponding to the first portion of the first data;
- determining a sequence number associated with the first data packet;
- determining a memory address corresponding to the first data packet;
- storing data included in the first data packet in the memory address;
- determining that the first portion of the first data does not include data corresponding to the second entries in the first bitmap;
- determining, based at least in part on determining that the first portion of the first data does not include data corresponding to the second entries, that the second portion of the first data was not received by the device;
- creating a second bitmap corresponding to the first data and indicative of the second portion of the first data, wherein the second bitmap includes a value corresponding to the sequence number and indicating the first data packet was received;
- after the second wireless communication link has been terminated, establishing a third wireless communication link between the device and the first access point;
- sending the second bitmap to the first access point via the third wireless communication link; and
- receiving, from the first access point, the second portion of the first data.

11. A computer-implemented method, comprising, by at least one server computer:
- sending to a device, via a first access point and a first wireless communication link, a first bitmap corresponding to first data to be sent by a second access point, the second access point storing the first data;
- sending to the device, via the first access point and the first wireless communication link, a network address of the second access point;
- after the first wireless communication link has been terminated, sending to the device, via the second access point and a second wireless communication link, the first data;
- after the second wireless communication link has been terminated, receiving from the device, via the first access point and a third wireless communication link, a second bitmap corresponding to the first data and indicative of a portion of the first data that was not received by the device;
- determining the portion of the first data; and
- sending to the device, via the first access point, the portion of the first data.

12. The computer-implemented method of claim 11, further comprising, by the at least one server computer: sending to the device, via the second access point and the second wireless communication link at a first time, the first data; sending to the device, via a third access point at a second time after the first time, the first data; and sending to the device, via the first access point at a third time after the second time, the portion of the first data.

13. The computer-implemented method of claim 11, further comprising, by the at least one server computer: sending to the device, via the first access point, a third bitmap corresponding to second data to be sent by a third access point, the third access point storing the second data; sending to the device, via the third access point, the second data; receiving from the device, via the first access point, a fourth bitmap corresponding to the second data and indicative of a second portion of the second data that was not received by the device; and sending to the device, via the first access point, the second portion of the second data.

14. The computer-implemented method of claim 11, further comprising, by the at least one server computer: sending, via the second access point using multicast transmission, the first data to a plurality of devices including the device; and sending, via the first access point to the device using a unicast transmission, the portion of the first data.

15. A computer-implemented method, comprising, by at least one server computer:
sending to a device, via a first access point and a first wireless communication link, a first bitmap corresponding to first data to be sent by a second access point, the second access point storing the first data, wherein:
the first data corresponds to firmware stored in solid-state storage of the device,
a first bit of the first bitmap corresponds to a first memory address of the solid-state storage,
the first bit of the first bitmap has a first value to indicate that the first data does not correspond to the first memory address,
a second bit of the first bitmap corresponds to a second memory address of the solid-state storage, and
the second bit of the first bitmap has a second value to indicate that that first data corresponds to the second memory address;
after the first wireless communication link has been terminated, sending to the device, via the second access point and a second wireless communication link, the first data;
after the second wireless communication link has been terminated, receiving from the device, via the first access point and a third wireless communication link, a second bitmap corresponding to the first data and indicative of a portion of the first data that was not received by the device;
determining the portion of the first data; and
sending to the device, via the first access point, the portion of the first data.

16. A computer-implemented method, comprising, by at least one server computer:
sending to a device, via a first access point and a first wireless communication link, a first bitmap corresponding to first data to be sent by a second access point, the second access point storing the first data;
after the first wireless communication link has been terminated, sending to the device, via the second access point and a second wireless communication link, the first data;
after the second wireless communication link has been terminated, receiving from the device, via the first access point and a third wireless communication link, a second bitmap corresponding to the first data and indicative of a portion of the first data that was not received by the device;
determining that a first bit of the second bitmap indicates that a first data packet of the first data was not received by the device;
determining the first data packet of the first data;
determining that a second bit of the second bitmap indicates that a second data packet of the first data was not received by the device;
determining the second data packet of the first data;
generating, the portion of the first data including the first data packet of the first data and the second data packet of the first data; and
sending, via the first access point to the device, the portion of the first data.

* * * * *